(12) United States Patent
Hirosawa et al.

(10) Patent No.: US 7,520,200 B2
(45) Date of Patent: Apr. 21, 2009

(54) BAR FEEDER AND BAR MACHINING SYSTEM

(75) Inventors: Kiyoshi Hirosawa, Chikusei (JP); Takazo Ito, Hachioji (JP); Kenji Sato, Yachiyo (JP); Hiroshi Shinohara, Nishi-Tokyo (JP)

(73) Assignees: Ikuraseiki Manufacturing Co., Ltd., Chikusei-shi, Ibaraki (JP); Citizen Holdings, Co., Ltd, Tokyo (JP)

( * ) Notice: Subject to any disclaimer, the term of this patent is extended or adjusted under 35 U.S.C. 154(b) by 323 days.

(21) Appl. No.: 11/367,413

(22) Filed: Mar. 6, 2006

(65) Prior Publication Data

US 2006/0153666 A1 Jul. 13, 2006

Related U.S. Application Data

(63) Continuation of application No. PCT/JP2004/012927, filed on Sep. 6, 2004.

(30) Foreign Application Priority Data

Sep. 5, 2003 (JP) ............................. 2003-314188

(51) Int. Cl.
*B23B 13/10* (2006.01)
(52) U.S. Cl. .............................. 82/127; 82/125; 82/126
(58) Field of Classification Search .......... 82/124–127; 414/14–18; *B23B 13/10*
See application file for complete search history.

(56) References Cited

U.S. PATENT DOCUMENTS

| | | | | |
|---|---|---|---|---|
| 1,637,176 A | * | 7/1927 | Davis .......................... | 470/177 |
| 2,345,207 A | * | 3/1944 | Mansfiled ..................... | 82/126 |
| 3,400,837 A | * | 9/1968 | Dalik ........................... | 414/17 |
| 3,613,487 A | * | 10/1971 | Werkmeister et al. ......... | 82/125 |
| 3,630,069 A | * | 12/1971 | White .......................... | 72/420 |
| 3,757,927 A | * | 9/1973 | Gable et al. .............. | 198/463.5 |
| 3,799,363 A | * | 3/1974 | Ross ............................ | 414/15 |
| 3,941,256 A | * | 3/1976 | Doe et al. ..................... | 414/17 |

(Continued)

FOREIGN PATENT DOCUMENTS

CN 1382549 A1 12/2002

(Continued)

*Primary Examiner*—Boyer D Ashley
*Assistant Examiner*—Sara Addisu
(74) *Attorney, Agent, or Firm*—Pillsbury Winthrop Shaw Pittman, LLP

(57) ABSTRACT

Disclosed is a bar feeder, which comprises a swing member designed to be swingably moved by a rotation shaft located above a guide rail. In normal mode, the swing member is kept in a standby in the vicinity of an upper position where the swing member is located to extend across and over a guide rail up to a bar rack. The swing member normally rotated to a lower position where the swing member is located on a far side from the bar rack with respect to the guide rail. During the process, the swing member receives a bar from the bar rack, and loads the bar to the guide rail. When a bar is removed from the guide rail, the movement of a bar to the swing member is inhibited by an inhibition member, and the swing member without a bar is moved to the lower position to create an ejection space between the rotation shaft and the bar rack. The present invention makes it possible to readily remove the bar loaded in the guide rail therefrom.

20 Claims, 10 Drawing Sheets

U.S. PATENT DOCUMENTS 5,662,014 A * 9/1997 Link ..................... 82/125

FOREIGN PATENT DOCUMENTS

| JP | 48-95673 | | | 3/1972 |
| --- | --- | --- | --- | --- |
| JP | 3-26401 | | | 3/1991 |
| JP | 06000704 | A | * | 1/1994 |
| JP | 3001964 | U | | 6/1994 |
| JP | 8-26472 | A | | 1/1996 |
| JP | 11165201 | | | 6/1999 |
| JP | 2002036005 | A | * | 2/2002 |
| JP | 2007276102 | A | * | 10/2007 |
| JP | 2008105138 | A | * | 5/2008 |

* cited by examiner

BAR FEEDER AND BAR MACHINING SYSTEM

CROSS REFERENCE OF RELATED APPLICATIONS

This is a continuation of International Patent Application No. PCT/JP2004/012927, filed Sep. 6, 2004, which relies for priority upon Japanese Patent Application No. 2003-314188, filed Sep. 5, 2003, the contents of both of which are incorporated herein by reference in their entireties.

TECHNICAL FIELD

The present invention relates to a bar feeder, and more specifically to a bar feeder for taking out a bar from a bar rack by a bar take-out mechanism and feeding the bar to a bar machining apparatus, and a bar machining system comprising a combination of the bar feeder and the bar machining apparatus.

BACKGROUND ART

Heretofore, there has been known a bar feeder for taking out a new bar by a bar take-out mechanism and feeding the bar to a bar machining apparatus. For example, the bar take-out mechanism includes a type designed to take out bars one-by-one from a bar rack by an index plate attached to a rotation shaft located above a guide rail for guiding bars to a bar machining apparatus, and then load the taken-out bar into the guide rail (see, for example, Japanese Registered Utility Model No. 3001964 (FIG. 2)).

With reference to FIG. 10, the conventional bar feeder will be described below by taking the bar feeder disclosed in Japanese Registered Utility Model No. 3001964 (FIG. 2) as an example. FIG. 10 is a fragmentary sectional view showing the bar feeder disclosed in that utility model.

As shown in FIG. 10, the bar feeder 200 comprises a guide rail 202 for guiding a bar B to a bar machining apparatus (not shown), a bar rack 204 located obliquely above the guide rail 202 and designed to allow a plurality of bars B to be placed thereon, and a bar take-out mechanism 206 for taking out the bars B one-by-one from the bar rack 204 and loading the taken-out bar B to the guide rail 202. The bar take-out mechanism 206 includes a plurality of rotatable members or disk-shaped index plates 210 which are attached, in spaced apart relation to each other, to a rotation shaft 208 located above the guide rail 202. Each of the index plates 210 has an outer peripheral surface formed with a plurality of concave portions or pockets 212 having different sizes corresponding, respectively, to various diameters of the bars B. The index plate 210 is releasably locked to the rotation shaft 208. In advance of a supply operation, the index plate 210 is locked to the rotation shaft 208 at a given position (rotational or angular position) where one 212a of the pockets 212 corresponding to a diameter of a specific type of bars B to be machined is aligned with the bar rack 204. Specifically, the index plate 210 after being released from the rotation shaft 208 is rotated to the given position where the pocket 212a corresponding to the diameter of the specific type of bars B to be machined is aligned with the bar rack 204, and then locked to the rotation shaft 208 at the given position. Although omitted in FIG. 10, the bar feeder 200 further includes a plurality of anti-vibration devices (not shown) for preventing vibrations of the bar B when this bar B is machined by the bar machining apparatus.

When the pocket 212a corresponding to a diameter of a specific type of bars B to be machined in this lot, among the pockets 212 formed in the outer peripheral surface of the index plate 210, is located at a position A1 or a position aligned with the bar rack 204, one of the bars B placed on the bar rack 204 in a line is received in the pocket 212a. Then, when the rotation shaft 208 is rotated in a direction indicated by the arrow 214 to move the pocket 212a of the index plate 210 to a position A2 or a lower position where the pocket 212a is disposed opposed to the guide rail 202, the bar B in the pocket 212a falls into the guide rail 202, i.e., the bar B is loaded into the guide rail 202. After completion of the loading of the bar B, when the rotation shaft 208 is reversely rotated in a direction indicated by the arrow 216 to move the pocket 212a of the index plate 210 back to the position A1, another one of the bars B to be loaded next is received in the pocket 212a to prepare for loading of the next bar B.

Then, the bar B loaded in the guide rail 202 is fed to the bar machining apparatus (not shown) in a direction from an upstream side to a downstream side along the guide rail 202 by use of a feed rod (not shown). Specifically, the feed rod has a front end provided with a finger chuck (not shown) for holding a rear end or upstream end of the bar B. After feeding a front end or downstream end of the bar B to a machining section of the bar machining apparatus, the feed rod moves the bar B forward by a given length of a product every time the bar machining apparatus cuts the bar B into the length of the product. When the bar B is shortened to have a length incapable of being cut into the given length of the product, the feed rod is pulled back toward the bar feeder 200, and the remaining bar is removed from the guide rail 202. The anti-vibration device is designed to have opening/closing movements interlocked with the rotation shaft 208 of the index plate 210. Specifically, when the pocket 212a of the index plate 210 is located at the position A1, the anti-vibration device is set in a closed position where it holds the bar B in the guide rail 202, so as to prevent vibrations of the bar during machining. When the pocket 212a of the index plate 210 is located at the position A2, the anti-vibration device is set to an open or release state to allow the next bar B to be loaded into the guide rail 202 without interference with the anti-vibration device.

DISCLOSURE OF THE INVENTION

Firstly, as described above, the conventional bar feeder 200 includes the index plate 210 having an outer peripheral surface formed with the pockets 212 corresponding to various diameters of the bars B. Thus, the bar feeder 200 needs to have a mechanism for reliably locking the index plate 210 to the rotation shaft 208. As a result, the index plate 210 and surrounding structures become complicated and costly. Moreover, every time the bars B to be machined are changed in diameter, one of the pockets corresponding to the diameter of the selected type of bars B has to be positionally reset, and this resetting operation has to be performed for all of the plurality of index plates. This causes the need for spending a lot of time in a setup operation.

Secondly, in the conventional bar feeder 200, there is the need to remove the bar B from the guide rail 202 before the bar B is shortened to a predetermined length, in some cases. For example, this need arises when a given number of products are obtained before the bar B is shortened or when some defect of the bar B causes extremely large vibrations of the bar B during machining. In the latter case, substantially the entire bar B having a long length of about 4 m has to be removed from the guide rail 202.

In an operation for removing the bar B from the guide rail 202, it is firstly necessary to lift up the bar B to a position outside of the guide rail 202. The bar B is a heavy article, and the index plates 210 and the bar rack 204 are located adjacent to the guide rail 202. Thus, it is extremely difficult to access to the bar B through a space between the above components and manually lift up the bar B in the guide rail 202. The operation for removing the bar B from the guide rail 202 may be performed by pulling out the bar B, for example, through a space between the adjacent index plates 210 while adequately moving the bar B in a longitudinal direction of the bar B. However, if the bar B has a long length, the pullout operation has to be performed by spending a lot of time and effort.

It is therefore a first object of the present invention to provide a bar feeder improved from a conventional type of bar feeder including a bar take-out mechanism for receiving a bar from a bar rack using a member adapted to be rotated by a rotation shaft located above the guide rail, which is capable of cutting out a setup time which is otherwise required when one type of bars B to be machined are changed to another type different in diameter.

It is a second object of the present invention to provide a bar feeder improved from conventional type of bar feeder including a bar take-out mechanism for receiving a bar from a bar rack using a member adapted to be rotated by a rotation shaft located above the guide rail, which is capable of readily removing the bar after being supplied to the guide rail.

It is a third object of the present invention to provide a bar machining system comprising a combination of the bar feeder and a bar machining apparatus.

In order to achieve the first object, the present invention provides a bar feeder for feeding a bar to a bar machining apparatus, which comprises a guide rail for guiding the bar to the bar machining apparatus, a bar rack located obliquely above the guide rail and designed to allow a plurality of bars to be placed thereon, and a bar take-out mechanism for taking out the bars one-by-one from the bar rack and loading the taken-out bar into the guide rail. The bar take-out mechanism includes a rotation shaft located above the guide rail, and a rotatable member attached to the rotation shaft for receiving the bar taken out from the bar rack. In this bar feeder, the rotatable member is a swing member designed to extend from the rotation shaft to the bar rack and receive the bar taken out from the bar rack, and the bar take-out mechanism further includes bar push-up device for pushing up one of the bars from the bar rack to supply the pushed bar to the swing member, and a controller. The controller is operable, in a normal mode for loading the bar into the guide rail, to normally rotate the swing member downward from an upper position where the swing member is located to extend across and over the guide rail up to the bar rack, to a lower position where the swing member is located on a far side from the bar rack with respect to the guide rail, while allowing the swing member to receive the bar taken out by the bar take-out mechanism, at any position between said upper and lower positions, and load the received bar into the guide rail, and then to reversely rotate the swing member back to a position adjacent to the upper position and keep the swing member in a standby state until an operation for loading a next one of the bars.

In the above bar feeder, in the normal mode, the rotation shaft is rotated according to control of the controller to allow the swing member to be swung from the upper position to the lower position. At the upper position or during the course of moving from the upper position to the lower position, the swing member receives the bar taken out by the bar push-up device. When the swing member is normally rotated (or moved in a normal rotation direction) to the lower position, the bar falls into the guide rail, i.e., the bar is loaded into the guide rail. Then, the swing member is swung from the lower position to the vicinity of the upper position, and kept in the standby state. Subsequently, the same operation will be repeatedly performed to load the bars one-by-one. As used in this specification, the term "vicinity of the upper position" includes the upper position.

At the upper position or during the course of moving from the upper position to the lower position, the swing member can receive one of the bars even if they have various diameters. Thus, as compared with the conventional bar feeder, the bar feeder of the present invention makes it possible to eliminate the need for changing a setup position of the pocket of the index plate and cut out a setup time which is otherwise required when one type of bars to be machined are changed to another type different in diameter.

Preferably, in the bar feeder of the present invention, the bar rack has a support surface for supporting the bars, and the swing member has a cam face on the opposite side of the bar rack with respect to the rotation shaft. Further, the bar push-up device includes a link mechanism extending from the vicinity of the cam face through below said guide rail to the bar rack. The link mechanism has a first end provided with a cam follower, and a second end provided with a push-up member designed to be movable between a retraction position where the push-up member is retracted so as not to protrude from the support surface, and a push-up position where the push-up member protrudes from the support surface so as to push up one of the bars. The cam follower is designed to follow along the cam face in conjunction with the swing movement of the swing member in such a manner as to move the bar push-up member between the retraction position and the push-up position.

In order to achieve the second object, a space for removing a bar from the guide rail is newly created.

In order to achieve the second object, the present invention provides a bar feeder for feeding a bar to a bar machining apparatus, which comprises a guide rail for guiding the bar to the bar machining apparatus, a bar rack located obliquely above the guide rail and designed to allow a plurality of bars to be placed thereon, and a bar take-out mechanism for taking out the bars one-by-one from the bar rack and loading the taken-out bar into the guide rail. The bar take-out mechanism includes a rotation shaft located above the guide rail, and a rotatable member attached to the rotation shaft for receiving the bar taken out from the bar rack. In this bar feeder, the rotatable member is a swing member designed to extend from the rotation shaft to the bar rack and receive the bar taken out from the bar rack, and the bar take-out mechanism further includes bar push-up device for pushing up one of the bars from the bar rack to supply the pushed bar to the swing member, and a controller. The controller is operable, in a normal mode for loading the bar into the guide rail, to normally rotate the swing member downward from an upper position where the swing member is located to extend across and over the guide rail, up to the bar rack, to a lower position where the swing member is located on a far side from the bar rack with respect to the guide rail, while allowing the swing member to receive the bar taken out by the bar take-out mechanism, at any position between the upper and lower positions, and load the received bar into the guide rail, and then to reversely rotate the swing member back to a position adjacent to the upper position and keep the swing member in a standby state until an operation for loading a next one of the bars. The bar feeder further includes inhibition device for preventing the bars from moving from the bar rack to the swing member when the bar residing in the guide rail is removed. The controller is operable, in response to a operation of an operator when the movement of the bars to the swing member is inhibited by the inhibition device in a removal mode for removing the bar residing in the guide rail, to move the swing member without a bar to the lower position or a further rotated position where the swing member is further normally rotated from the lower position, so as to create an ejection space for ejecting the bar from the guide rail, between the rotation shaft and the bar rack.

In the above bar feeder, in the normal mode, the rotation shaft is rotated according to control of the controller to swing the swing member from the upper position to the lower position. At the upper position or during the course of moving from the upper position to the lower position, the swing member receives the bar taken out by the bar push-up device. When the swing member is normally rotated to the lower position, the bar falls into the guide rail, i.e., the bar is loaded into the guide rail. Then, the swing member is swung from the lower position to the vicinity of the upper position, and kept in the standby state. Subsequently, the same operation will be repeatedly performed to load the bars one-by-one. As used in this specification, the term "vicinity of the upper position" includes the upper position.

In the normal mode, it occurs that the bar loaded in the guide rail has to be removed from the guide rail, in some cases. In this case, in response to a operation by an operator, the normal mode is switched to the removal mode. In the removal mode, the controller controls several devices of the bar feeder to allow the bar to be removed from the guide rail. Specifically, while the supply of the bar to the swing member is inhibited, the swing member is swung from the vicinity of the upper position to the lower position or the further rotated position. Since the supply of the bar is inhibited, when the swing member without a bar is moved to the lower position or the further rotated position, the ejection space for allowing the bar to be ejected from the guide rail is created between the rotation shaft located above the guide rail and the bar rack located obliquely above the guide rail.

In the normal mode, when the swing member is in the standby state in the vicinity of the upper position, the swing member is located to extend from the rotation shaft to the bar rack across and over the guide rail, and therefore the space between the rotation shaft and the bar rack is blocked by the swing member. Thus, the bar in the guide rail cannot be removed through this space. In contrast, in the removal mode, the swing member is moved to the lower position located on a far side from the bar rack with respect to the guide rail. Thus, the obstacle is eliminated, and the ejection space for allowing the bar in a horizontal position to be removed can be created between the rotation shaft and the bar rack. Thus, the bar in the guide rail can be readily removed through the ejection space.

Preferably, in the bar feeder of the present invention, the bar rack has a support surface for supporting the bars, and the swing member has a cam face on the opposite side of the bar rack with respect to the rotation shaft. Further, the bar push-up device includes a link mechanism extending from the vicinity of the cam face through below said guide rail to the bar rack. The link mechanism has a first end provided with a cam follower, and a second end provided with a push-up member designed to be movable between a retraction position where the push-up member is retracted so as not to protrude from the support surface, and a push-up position where the push-up member protrudes from the support surface so as to push up one of the bars. The cam follower is designed to follow along the cam face in conjunction with the swing movement of the swing member in such a manner as to move the bar push-up member between the retraction position and the push-up position.

In this bar feeder, the movement of the bar push-up device between the retraction position and the push-up position is achieved by moving the cam follower of the link mechanism along the cam face of the swing member. According to this embodiment of the present invention, the rotational movement of the swing member and the movement of taking out of the bar from the bar rack can be synchronized with one another, and the link mechanism arranged to bypass the ejection space can avoid hindering the bar ejecting operation. This makes it possible to readily remove the bar from the guide rail.

In another embodiment of the present invention, the guide rail may have a plurality of guide rail portions arranged coaxially in spaced-apart relation to each other, and include a bar lift device disposed between the adjacent guide rail portions and designed to lift up the bar residing in the guide rail from below the bar to the ejection position.

This bar feeder using the bar lift device makes it easy to move the bar, particularly, heavy bar, from the guide rail to the ejection space. The number of the bar lift device may be one, or may be two or more.

Preferably, in this embodiment, the lift device includes a lift member disposed to extend in a direction intersecting with the guide rail portion and designed to be pivotally moved about a first pivot shaft having an axis oriented in a longitudinal direction of the guide rail portion, a operation lever for pivotally moving the lift member about the first pivot shaft between an escape position where the lift member is located flush with or below an inner bottom surface of the guide rail, and a lift position where the lift member is located above the inner bottom surface, and a lock device for locking the operation lever to allow the lift member to be kept at the lift position.

In this bar feeder, when the operation lever is operated to pivotally move the lift member about the first pivot shaft from the escape position where the lift member is located flush with or below the inner bottom surface of the guide rail to the lift position where the lift member is located above the inner bottom surface, the bar in the guide rail is lifted up to the ejection space while being supported by the lift member. Then, the operation lever can be locked by the lock device so as to keep the lift member at the lift position to allow the bar to be kept at a position where it is lifted to the ejection space.

After the bar is lifted to the ejection space, the operator can release his/her hand from the operation lever. This allows the operator to readily remove the bar through the ejection space.

Preferably, in this embodiment, the operation lever is disposed to extend to the other side of the first pivot shaft with respect to the lift member, and pivotally attached to the lift member through a second pivot shaft oriented vertically relative to an axis of the first pivot shaft. The operation lever is designed to be movable along a first path defined when the lift member is moved about the first pivot shaft from the escape position and the lift position, and a second path defined when the operation lever is moved in association with its lateral pivotal movement about the second pivot shaft, from an end position of the first path to a lock position where the operation lever is locked by the lock device so as to keep the lift member at the lift position, and the lock device has a abutting surface formed to extend across and above of the operation lever at the lock position so as to lock the operation lever.

In this bar feeder, the lift member extends to the other side of the first pivot shaft with respect to the lift member. Thus, the operation lever can be moved downward along the first path to move the lift member from the escape position to the lift position. Subsequently, the operation lever is moved to the lock position where the operation lever is locked by the lock device so as to keep the lift member at the lift position, along the second path associated with the lateral movement about the second pivot shaft. An upward force from the bar supported by the lift member acts on the operation lever. Thus, the operation lever is automatically locked by the abutting surface extending across and above the operation lever, and thereby the lift member is kept at the lift position.

The operator can automatically lock the operation lever at the lock position only by moving the operation lever along the first path and the second path. This allows the operator to perform the series of operations for lifting up the lift member supporting the bar to the lift position and keeping the lift member at the lift position smoothly and readily.

More preferably, the bar feeder according to this embodiment has a sidewall, and the operation lever extends from the lift member and penetrates the sidewall to protrude outside the sidewall. Further, the sidewall is formed with a cutout portion for allowing the operation lever to be moved along the first path and the second path. The cutout portion has the abutting surface.

In this bar feeder, the operation lever penetrates the sidewall to protrude outside the sidewall, and the sidewall is formed with the cut out portion for allowing the operation lever to be moved therealong and the abutting surface for locking the operation lever. Thus, the operator can readily operate the operation lever from outside the sidewall without detaching the sidewall.

More preferably, in this embodiment, the operation lever has a portion located inside the sidewall and detachably attached to the lift member.

In this bar feeder, the operation lever obstructively extending outside the sidewall can be detached from the lift member in the normal mode for loading the bar into the guide rail. Then, for the purpose of using the bar lift device in the removal mode for removing the bar residing in the guide rail, the operation lever can be readily attached to the lift member from outside the sidewall.

The second object of the present invention can also be achieved by the following bar feeder. This bar feeder for feeding a bar to a bar machining apparatus comprises a guide rail for guiding the bar to the bar machining apparatus, a bar rack located obliquely above the guide rail and designed to allow a plurality of bars to be placed thereon, and a bar take-out mechanism for taking out the bars one-by-one from the bar rack and loading the taken-out bar into the guide rail. The bar take-out mechanism includes a rotation shaft located above the guide rail, and a rotatable attached to the rotation shaft member for receiving the bar taken out from the bar rack. In this bar feeder, the rotatable member is a swing member designed to extend from the rotation shaft to the bar rack and receive the bar taken out from the bar rack, and the bar take-out mechanism further includes bar push-up device designed to be movable between a push-up position for pushing up one of the bars from the bar rack and a retraction position, and a controller. The controller is operable, in a normal mode for loading the bar to the guide rail, to normally rotate the swing member downward from an upper position where the swing member is located to extend across and over the guide rail up to the bar rack, to a lower position where the swing member is located on a far side from the bar rack with respect to the guide rail, while allowing the swing member to receive the bar taken out by the bar take-out mechanism, at any position between the upper and lower positions, and load the received bar into the guide rail, and then to reversely rotate the swing member back to a position adjacent to the upper position and keep the swing member in a standby state until an operation for loading a next one of the bars. Further, the controller is operable, in response to a operation of an operator in a removal mode for removing the bar residing in the guide rail, to keep the bar push-up device at the retraction position, and move the swing member without a bar to the lower position or a position where the swing member is further normally rotated from the lower position, so as to create an ejection space for ejecting the bar from the guide rail, between the rotation shaft and the bar rack.

In the normal mode, the above bar feeder operates in the same manner as that in the aforementioned bar feeders of the present invention. In the removal mode, the controller controls several devices of the bar feeder to remove the bar from the guide rail. Specifically, the bar push-up device is kept at the retraction position, and the swing member is swung from the vicinity of the upper position to the lower position. The bar is never taken out from the bar rack because the bar push-up device is kept at the retraction position, and the swing member without a bar is moved to the lower position or the further-normally-rotated position. When the swing member is swung to the lower position or the further-normally-rotated position, the ejection space for allowing the bar to be ejected from the guide rail is created between the rotation shaft located above the guide rail and the bar rack located obliquely above the guide rail. Thus, the bar in the guide rail can be readily removed through the ejection space.

In an embodiment of the aforementioned bar feeders intended to achieve the second object of the present invention, the bar rack may have a bar regulation section disposed above the support surface to regulate the bars in such a manner as to be placed on the support surface in a line, and a support structure extending across the ejection space to support the bar regulation section. The support structure may be designed to be movable to a position for escaping from the ejection space.

In this bar feeder, the support structure can be escaped from the ejection space to eliminate any obstacle from the ejection space. This makes it possible to readily remove the bar in the guide rail through the ejection space.

The third object of the present invention can be achieved by providing the following controller to the bar machining apparatus.

Specifically, the present invention provides a bar machining system which comprises a bar machining apparatus for machining a bar, and a bar feeder for feeding the bar to the bar machining apparatus. The bar feeder includes a guide rail for guiding the bar to a bar machining apparatus, a bar rack located obliquely above the guide rail and designed to allow a plurality of bars to be placed thereon, and a bar take-out mechanism for taking out the bars one-by-one from the bar rack and loading the taken-out bar into the guide rail. The bar take-out mechanism includes a rotation shaft located above the guide rail, and a rotatable member attached to the rotation shaft for receiving the bar taken out from the bar rack. In this bar machining system, the rotatable member is a swing member designed to extend from the rotation shaft to the bar rack and receive the bar taken out from the bar rack, and the bar take-out mechanism further includes bar push-up device for pushing up one of the bars from the bar rack to supply the pushed bar to the swing member. Further, the bar machining apparatus includes a controller operable, in a normal mode for loading the bar into the guide rail, to normally rotate the swing member downward from an upper position where the swing member is located to extend across and over the guide rail up to the bar rack, to a lower position where the swing member is located on a far side from the bar rack with respect to the guide rail, while allowing the swing member to receive the bar taken out by the bar take-out mechanism, at any position between the upper and lower positions, and load the received bar into the guide rail, and then to reversely rotate the swing member back to a position adjacent to the upper position and keep the swing member in a standby state until an operation for loading a next one of the bars.

The third object of the present invention can also be achieved by providing the following controller to the bar machining apparatus.

Specifically, the present invention provides a bar machining system which comprises a bar machining apparatus for machining a bar, and a bar feeder for feeding the bar to the bar machining apparatus. The bar feeder includes a guide rail for guiding the bar to the bar machining apparatus, a bar rack located obliquely above the guide rail and designed to allow a plurality of bars to be placed thereon, and a bar take-out mechanism for taking out the bars one-by-one from the bar rack and loading the taken-out bar into the guide rail. The bar take-out mechanism includes a rotation shaft located above the guide rail, and a rotatable member attached to the rotation shaft for receiving the bar taken out from the bar rack. In this bar machining system, the rotatable member is a swing member designed to extend from the rotation shaft to the bar rack and receive the bar taken out from the bar rack, and the bar take-out mechanism further includes bar push-up device for pushing up one of the bars from the bar rack to supply the pushed bar to the swing member. Further, the bar machining apparatus includes a controller operable, in a normal mode for loading the bar into the guide rail, to normally rotate the swing member downward from an upper position where the swing member is located to extend across and over the guide rail up to the bar rack, to a lower position where the swing member is located on a far side from the bar rack with respect to the guide rail, while allowing the swing member to receive the bar taken out by the bar take-out mechanism, at any position between the upper and lower positions, and load the received bar into the guide rail, and then to reversely rotate the swing member back to a position adjacent to the upper position and keep the swing member in a standby state until an operation for loading a next one of the bars. Furthermore, the bar feeder further includes inhibition device for preventing the bars from moving from the bar rack to the swing member in a removal mode for removing the bar residing in the guide rail, and the controller is operable, in response to a operation of an operator when the movement of the bars to the swing member is inhibited by the inhibition device in the removal mode for removing the bar residing in the guide rail, to move the swing member without a bar to the lower position or a position where the swing member is further normally rotated from the lower position, so as to create an ejection space for ejecting the bar from the guide rail, between the rotation shaft and the bar rack.

The third object of the present invention can also be achieved the following bar machining system. This bar machining system comprises a bar machining apparatus for machining a bar, and a bar feeder for feeding the bar to the bar machining apparatus. The bar feeder includes a guide rail for guiding the bar to the bar machining apparatus, a bar rack located obliquely above the guide rail and designed to allow a plurality of bars to be placed thereon, and a bar take-out mechanism for taking out the bars one-by-one from the bar rack and loading the taken-out bar into the guide rail. The bar take-out mechanism includes a rotation shaft located above the guide rail, and a rotatable member attached to the rotation shaft for receiving the bar taken out from the bar rack. In this bar machining system, the rotatable member is a swing member designed to extend from the rotation shaft to the bar rack and receive the bar taken out from the bar rack, and the bar take-out mechanism further includes bar push-up device designed to be movable between a push-up position for pushing up one of the bars from the bar rack and a retraction position. Further, the bar machining apparatus includes a controller. The controller is operable, in a normal mode for loading the bar to the guide rail, to normally rotate the swing member downward from an upper position where the swing member is located to extend across and over the guide rail up to the bar rack, to a lower position where the swing member is located on a far side from the bar rack with respect to the guide rail, while allowing the swing member to receive the bar taken out by the bar take-out mechanism, at any position between the upper and lower positions, and load the received bar into the guide rail, and then to reversely rotate the swing member back to a position adjacent to the upper position and keep the swing member in a standby state until an operation for loading a next one of the bars. The controller is also operable, in response to a operation of an operator in a removal mode for removing the bar residing in the guide rail, to keep the bar push-up device at the retraction position, and move the swing member without a bar to the lower position or a position where the swing member is further normally rotated from the lower position, so as to create an ejection space for ejecting the bar from the guide rail, between the rotation shaft and the bar rack.

In an embodiment of the above bar machining systems intended to achieve the third object of the present invention, the bar rack may have a bar regulation section disposed above the support surface to regulate the bars in such a manner as to be placed on the support surface in a line, and a support structure extending across the ejection space to support the bar regulation section. The support structure may be designed to be movable to a position for escaping from the ejection space.

Further, in order to achieve the aforementioned second object, the present invention provides a bar feeder provided with a lift member for removing a bar from a guide rail.

Specifically, the present invention provides a bar feeder for feeding a bar to a bar machining apparatus, which comprises a guide rail for guiding the bar to the bar machining apparatus. The guide rail has a plurality of guide rail portions arranged coaxially in spaced-apart relation to each other, and includes bar lift device disposed between the adjacent guide rail portions and designed to lift up the bar residing in the guide rail from below the bar to a position outside of the guide rail so as to eject the bar.

As above, in a bar feeder comprising s bar take-out mechanism designed to receive a bar from a bar rack using a member adapted to be rotated by a rotation shaft located above a guide rail, the present invention makes it possible to cut out a setup time which is otherwise required when one type of bars B to be machined are changed to another type different in diameter.

Further, in a bar feeder comprising s bar take-out mechanism designed to receive a bar from a bar rack using a member adapted to be rotated by a rotation shaft located above a guide rail, the present invention makes it possible to readily remove the bar loaded in the guide rail, from the guide rail.

In addition, the present invention can provide a bar machining system comprising a combination of the above bar feeder and a bar machining apparatus.

BEST MODE FOR CARRYING OUT THE INVENTION

Figure 1:
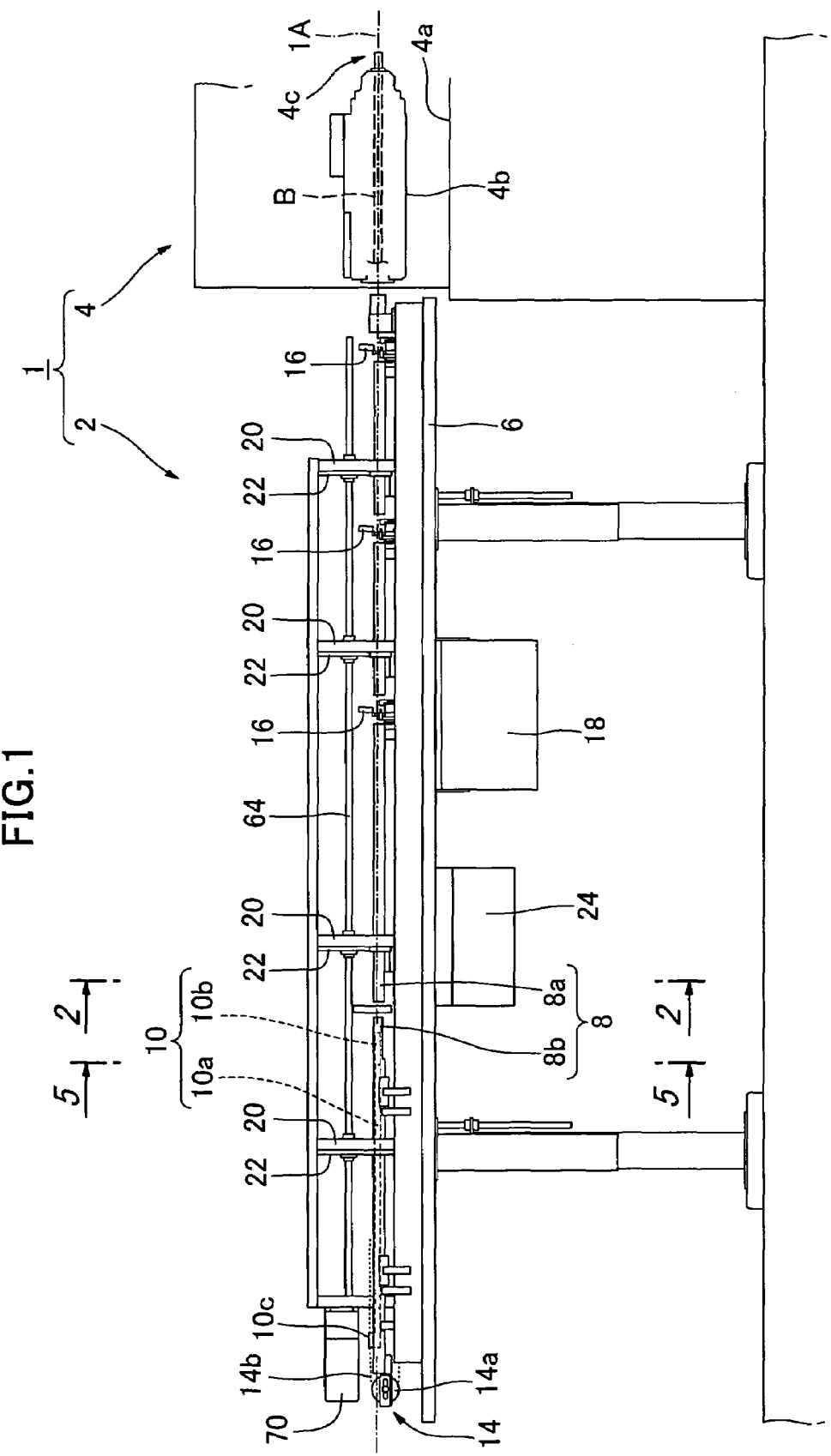
FIG. 1 is a schematic front view showing a bar machining system comprising a bar machining apparatus and a bar feeder disposed adjacent thereto according to a first embodiment of the present invention.
Figure 2:
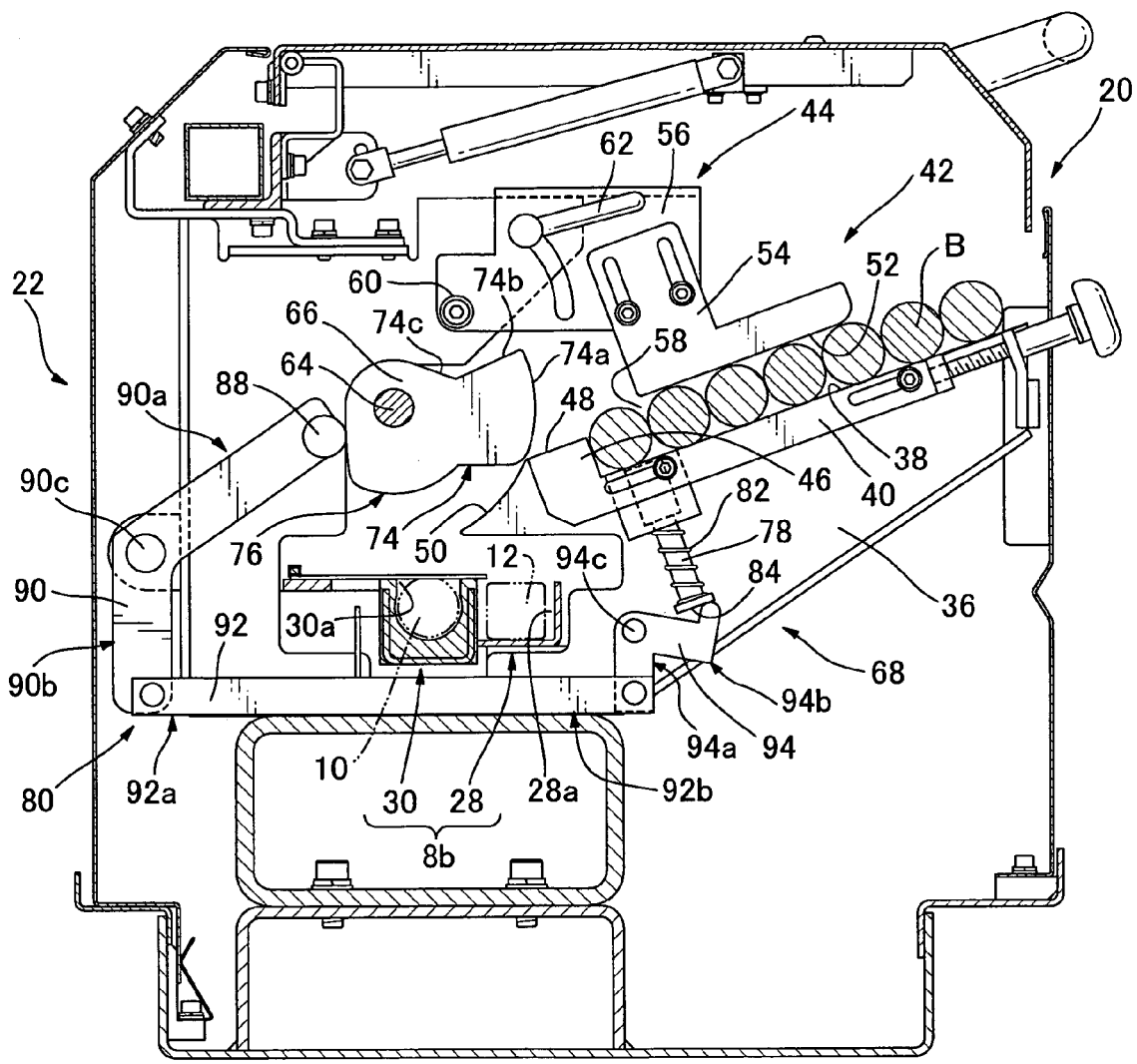
FIG. 2 is a cross-sectional view showing the bar feeder when a swing member is located at an upper position, taken along the line 2-2 in FIG. 1.

With reference to the drawings, a bar machining system and a bar feeder according to a first embodiment of the present invention will now be described. FIG. 1 is a front view schematically showing a bar machining system comprising a bar machining apparatus and a bar feeder disposed adjacent thereto according to the first embodiment of the present invention. FIG. 2 is a cross-sectional view taken along the line 2-2 in FIG. 1.

As shown in FIG. 1, a bar machining system 1 in this embodiment comprises a bar feeder 2 designed to extend in a longitudinal direction or along a feeding axis 1A on which a bar B is fed from an upstream or rearward side to a downstream or frontward side for feeding a bar B to be machined in the longitudinal direction, and a bar machining apparatus 4 disposed downstream of the bar feeder 2.

For example, the bar machining apparatus 4 is a spindle-fixed type NC lathe. The following description will be made on the assumption that the bar machining apparatus 4 is a spindle-fixed type NC lathe. This NC lathe 4 comprises a headstock 4a, a spindle 4b disposed above the head stock 4a and extending along the feeding axis 1A, and a machining section 4c for machining a portion of the bar located on the downstream side of the spindle 4b.

The bar feeder 2 comprises a support frame 6, a guide rail 8 supported by the support frame 6 and designed to extend along the feeding axis 1A and guide the bar B to the lathe 4, a feed rod 10 for pushing and feeding the bar B toward the NC lathe 4 along the guide rail 8, a primary feed member 12 (see FIG. 2) for primarily feeding the bar B, a feed-rod driving device 14 for selectively moving the feed rod 8 frontward and rearward in a feeding direction, a primary-feed-member driving device (not shown) for selectively moving the primary feed member 12 frontward and rearward in the feeding direction, a plurality of anti-vibration devices 16 for gripping the bar B to prevent vibration thereof when the bar B is machined in the NC lathe 4, a remainder rack 18 for storing the bars B (remaining bars or rods) brought back from the NC lathe 4 after completion of machining, a bar rack 20 (see FIG. 2) located obliquely above the guide rail 8 when viewed in a longitudinal direction of the guide rail and designed to allow a plurality of the bars B (new bars or rods) to be placed thereon, a bar take-out mechanism 22 designed to take out the bars B one-by-one from the bar rack 20 and load the taken-out bar B into the guide rail 8, and a controller 24 for controlling various devices of the bar feeder 2, such as the feed-rod driving device 14, the anti-vibration devices 16, the primary-feed-member driving device (not shown) and the bar take-out mechanism 22.

Firstly, the guide rail 8 will be described below. As shown in FIG. 1, the guide rail 8 has a plurality of guide rail portions 8a, 8b arranged in spaced-apart relation to each other. Specifically, the guide rail 8 has a downstream guide rail portion 8a disposed coaxially with the feeding axis 1A on the downstream side of the support frame 6, and an upstream guide rail portion 8b disposed on the upstream side of the support frame 6.

The downstream guide rail portion 8a is further divided into a plurality (three in this embodiment) of segments, and the anti-vibration devices 16 are disposed between the adjacent segments of the downstream guide rail portion 8a and on the front side of a downstream end of the downstream-most segment of the guide rail portion 8a, respectively. Each of the segments of the downstream guide rail portion 8a has an upper opening (not shown) for receiving the bar B released from the bar take-out mechanism 22, and a cross-sectional U-shaped inner space (not shown) formed in the downstream guide rail portion 8a to allow the bar B and the feed rod 10 to be moved therethrough.

As shown in FIG. 2, the upstream guide rail portion 8b includes a primary feeding guide rail portion 28 and a secondary feeding guide rail portion 30 which are disposed in side-by-side relation to one another. The primary feeding guide rail portion 28 has an upper opening for receiving the bar, and a U-shaped inner space formed in the primary feeding guide rail portion 28 to allow the primary feed member 12 and the bar B to be moved therethrough. The secondary feeding guide rail portion 30 has a U-shaped inner space formed therein to allow the feed rod 10 to be moved therethrough. The upstream guide rail portion 8b is designed to be laterally moved between a primary feeding side position (not shown) where the primary feeding guide rail portion 28 is aligned with the downstream guide rail portion 8a, and a secondary feeding side position (see FIG. 2) where the secondary feeding guide rail portion 30 is aligned with the downstream guide rail portion 8a, by a linear guide device (not shown) and a driving device (not shown). This driving device is designed to be controlled by the controller 24.

Next the feed rod 10 and the primary feed member 12 will be described below. The feed rod 10 is designed to be selectively moved frontward and rearward in the feeding direction through the respective inner spaces of the secondary feeding guide rail portion 30 and the downstream guide rail portion 8a so as to push and feed a bar B to the bar machining apparatus 4. The feed rod 10 includes a main body 10a located on the upstream side, and a finger chuck 10b located downstream of the main body 10a and designed to grip a rear end of the bar B. The finger chuck 10b is connected to the main body 10a in a rotatable manner about a longitudinal axis thereof through a chuck joint (not shown). The main body 10a has a rear end provided with a bladed member 10c for attaching an endless chain 14b of the after-mentioned feed-rod driving device 14 thereto.

The primary feed member 12 is designed to be selectively moved frontward and rearward in the feeding direction through the inner space 28a of the primary feeding guide rail portion 28 so as to move the bar B in the primary feeding guide rail portion 20 to a primary feeding position along the downstream guide rail portion 8a. The primary feed member 12 has a block shape.

Next, the feed-rod driving device 14 and the primary-feed-member driving device (not shown) will be described below.

The feed-rod deriving device 14 serves as a device to selectively move the feed rod 10 frontward and rearward along the feeding axis 1A through the guide rail 8, and designed to be on/off controlled by the controller in such a manner as to move the feed rod 10 frontward or rearward or stop the feed rod 10 at a given position. The feed-rod driving device 14 fundamentally comprises a servomotor (not shown), a power transmission section 14a, such as a sprocket connected to an output shaft of the servomotor, and an endless chain 14b connected to the power transmission section and circulated substantially parallel to the feeding axis. This endless chain 14b is attached to the bladed member 10c of the feed rod 10.

The primary-feed-member driving device (not shown) serves as a device to selectively move the primary feed member 12 frontward and rearward along the feeding axis 1A. The primary-feed-member driving device has the same structure as that of the feed-rod driving device 14 except for that the feed rod 10 is replaced with the primary feed member 12, and its description is omitted.

Next, with reference to FIG. 2, the bar rack 20 will be described below. The bar racks 20 has a plurality of units arranged in spaced-apart relation to each other in the longitudinal direction of the guide rail 8. In this embodiment, each unit of the bar rack 20 comprises a rack member 40 supported by a bar rack support member 36 attached to the support frame 6 and formed with a support surface 38 for supporting a plurality of the bars B, a bar regulation section 42 disposed above the support surface 38 and designed to allow the bars B to be placed on the support surface 38 in a line, and a support structure 44 for supporting the bar regulation section 42. The support surface 38 of the rack member 40 is inclined downward toward the guide rail 8 or inclined toward a downstream in a moving direction of the bars B on the support surface. The rack member 40 has a stopper 46 formed at one end thereof on the side of the guide rail 8 to protrude upward from the support surface 38 so as to prevent the bars B from falling off the bar rack 4. The stopper 46 has a top surface 48 which is also inclined downward toward the guide rail 8. Further, each unit of the bar rack 20 has a guide surface 50 formed to extend from an end of the top surface 48 on the side of the guide rail 8 toward the vicinity of the upper opening of the guide rail 8, and guide the bar B toward the guide rail 8. In this embodiment, the guide surface 50 is formed in the bar rack support member 36. Preferably, the guide surface 50 is formed in an arc shape having a center at an after-mentioned rotation shaft 64.

The bar regulation section 42 includes a bar regulation member 54 having a bottom surface serving as a regulation surface 52 which is disposed above and substantially parallel to the support surface 38 to regulate the bars B in a manner of being arranged on the support surface 38 in a line. The support structure 44 extends from a location above the rack member 40 across and over the guide rail 8. The support structure 44 has an anchor end fixed to the support frame 6, and a distal end to which the bar regulation member 54 is attached. The bar regulation member 54 is disposed in such a manner that an end of the regulation surface 52 thereof on the side of a downstream end of the rack member 40 is terminated at a position more upstream than a downstream end of the support surface 38 of the rack member 40 by a diameter of the bar B, so as to allow a leading one of the bars B to be taken out. Thus, an opening for taking out the bar therethrough is defined between the rack member 40 and the bar regulation member 54.

The bar regulation member 54 is supported by a regulation-section support member 56 in a manner of allowing the bar regulation member 54 to be moved in a direction coming away from the rack member 40. More specifically, in this embodiment, the bar regulation member 54 is supported by the regulation-section support member 56 in a pivotally movable manner about a pivot position 60 of the regulation-section support member 56 is fixed by a fastener 62 such as a clamp lever. In this way, the regulation-section support member 56 and the bar regulation member 54 can be pivotally moved between a regulation position (see FIG. 2) for regulating the bars B on the rack member 40 and an escape position (see FIG. 5) after been moved in the direction coming away from the rack member 40.

Next, with reference to FIG. 2, the bar take-out mechanism 22 will be described below. The bar take-out mechanism 22 comprises a rotation shaft 64 located above the guide rail 8, a swing member 66 serving as a ratable member attached to the rotation shaft 64 and designed to receive the bar taken out from the bar rack 20, and a bar push-up device 68 designed to push up one of the bars B from the bar rack 20 and load the taken-out bar to the swing member 66.

The rotation shaft 64 extends substantially over the entire length of the bar feeder 2 (see FIG. 1). The rotation shaft 64 has a rear end connected to an output shaft of a servomotor 70 for rotating the rotation shaft 64. A rotational angle of the servomotor and a rotational position of the swing member 66 corresponding thereto can be controlled by the controller.

Actually, a plurality of swing members 66 are fixed, in spaced-apart relation to each other in the longitudinal direction, to the rotation shaft 64, and each of the swing members 66 is disposed adjacent to a corresponding one of the rack members 40.

Figure 3:
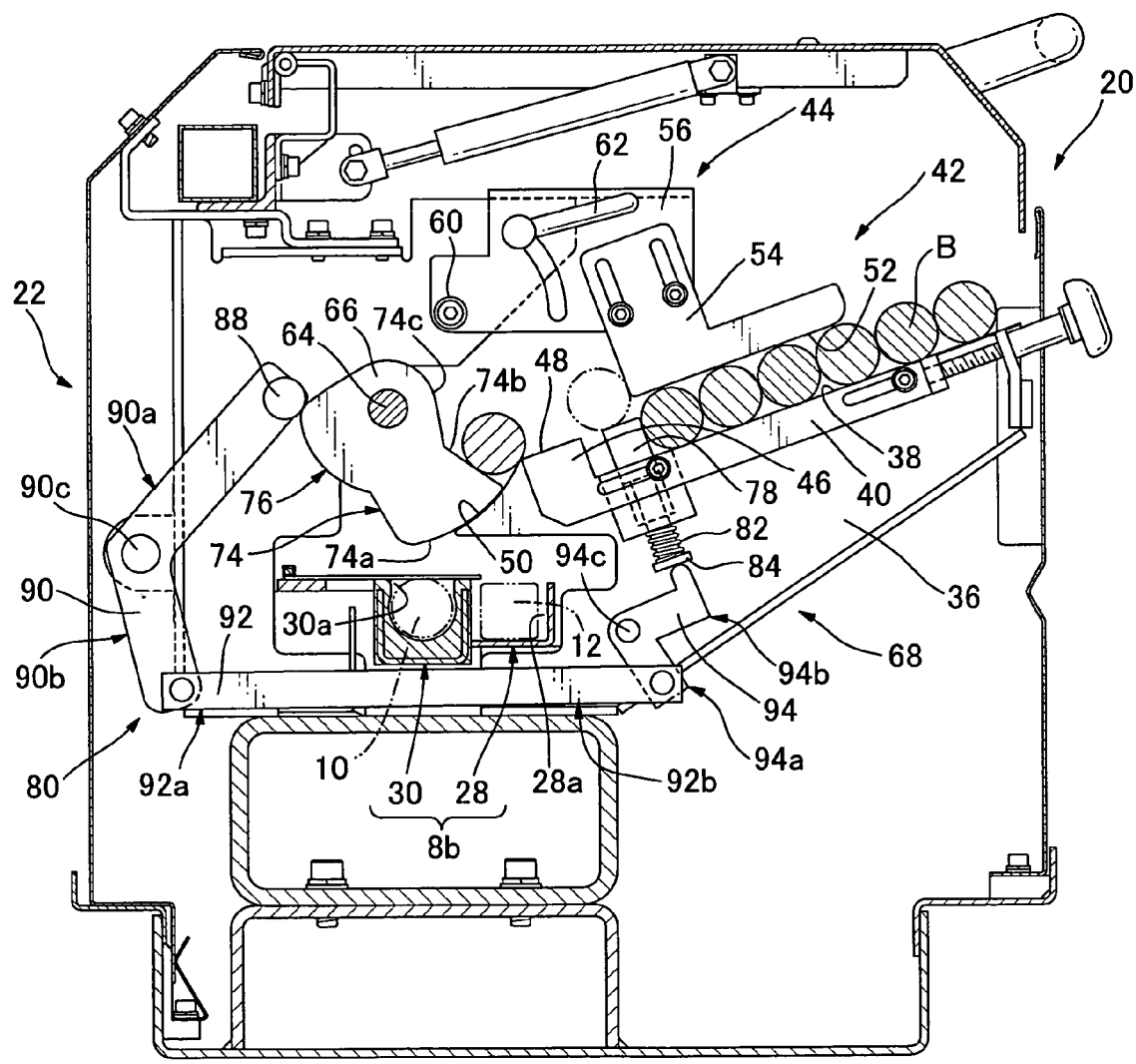
FIG. 3 is located at a cross-sectional view showing the bar feeder in when the swing member is in an intermediate position, taken along the line 2-2 in FIG 1.
Figure 4:
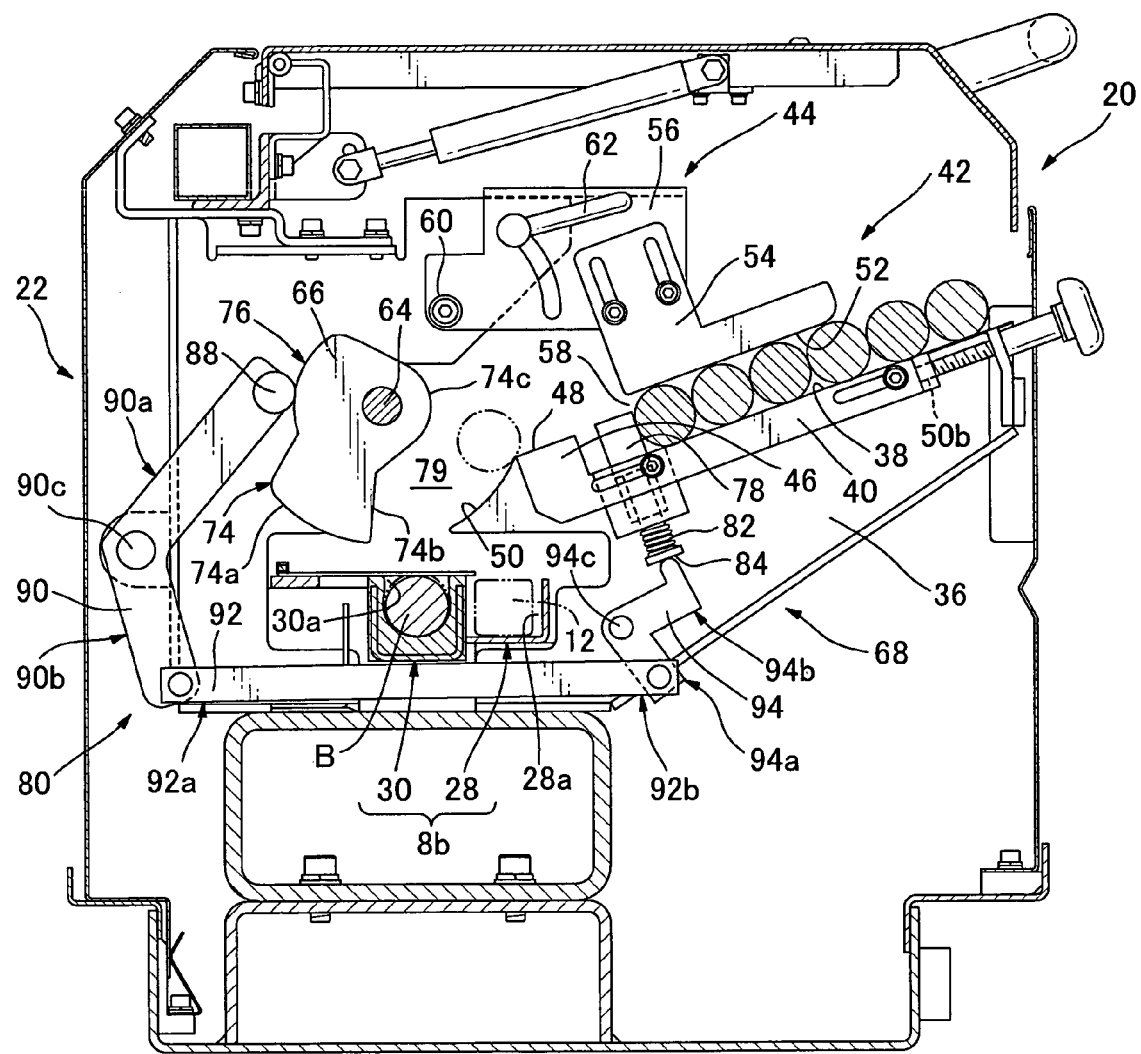
FIG. 4 is a cross-sectional view showing the bar feeder when the swing member is located at a lower position, taken along the line 2-2 in FIG. 1.
Figure 5:
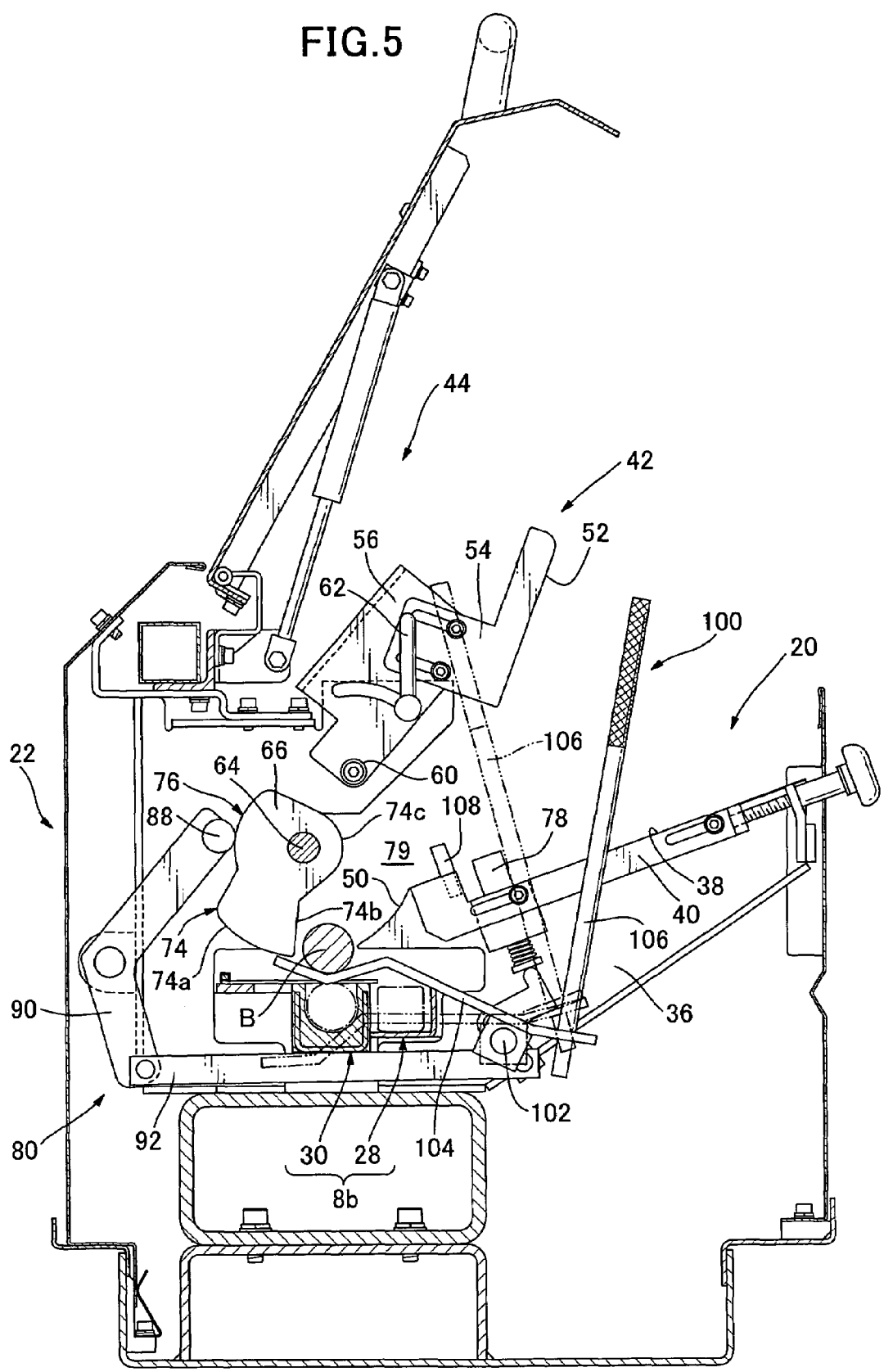
FIG. 5 is a cross-sectional view showing the bar feeder in a state when the swing member is located at the lower position, taken along the line 5-5 in FIG. 1.

Next, with reference to FIGS. 2 to 5, the swing members 66 and the bar push-up device 68 will be described in more detail. FIG. 2 shows the swing member 66 located at an upper position, and FIGS. 3 is a cross-sectional view showing the swing member 66 located at an intermediate position, in the same cross-section as that in FIG. 2. FIG. 4 is a cross-sectional view showing the swing member 66 located at a lower position for loading the bar carried by the swing member 66 into the guide rail 8, in the same cross-section as that in FIG. 2. FIG. 5 is a cross-sectional view showing the regulation-section support member 56 and the bar regulation member 54 located at the escape position, in the same cross-section as that in FIG. 4.

The swing member 66 is designed to be swung about the rotation shaft 64 between an upper position where the swing member 66 stands ready to load a next one of the bars B and a lower position where the swing member 66 loads the bar B to the guide rail 8. The swing member 66 receives the bar B from the bar rack 20 at any intermediate position existing in the course of the swing movement from the upper position to the lower position.

As shown in FIG. 2, the swing member 66 has a bar receiving portion 74 for receiving the bar B from the bar rack 20, and a cam face 76 formed substantially on the opposite side of the bar receiving portion 74 or the bar rack 20 with respect to the rotation shaft 74. The bar receiving portion 74 has a circumferential face 74a defined by an arc with a relatively large curvature radius having a center set at the rotational axis 64, a receiving face 74b connecting to the circumferential face 74a and extending radially and outward from the rotation shaft 64, and a flank face 74c defined by an arc with a relatively small curvature radius having a center set at the rotational axis 64. When the above guide surface 50 is defined by an arc having a center set at the rotational axis 64, the circumferential face 74a is preferably formed in an arc shape complementary thereto. At the upper position, the swing member 66 is located to extend from the rotation shaft 64 to the upper side of the bar rack 26 across and over the guide rail 8.

As shown in FIG. 3, when the swing member 66 is located at the intermediate position, a substantially V shape is formed between the bar rack 20 and the receiving face 74b of the swing member 66 (more specifically, the guide surface 50 or the top surface 48 of the stopper 46, and the swing member 66). Further, the circumferential face 74a is located partially opposed to the guide surface 50, and the receiving face 74b is located lower than the top surface 48 of the stopper 46 of the bar rack 20, so that a space for receiving the bar B taken out from the bar rack 20 is created between the guide surface 50 and the receiving face 74b. At the intermediate position, the swing member 66 is also located to extend from the rotation shaft 64 to the upper side of the bar rack 20 across and over the guide rail 8. It is understood that FIG. 3 shows one example of the intermediate position where the swing member 66 receives the bar B. The position where the swing member 66 receives the bar B is varied depending on a speed at which the bar rolls on the top surface 46 of the stopper 46. Thus, the position where the swing member 66 receives the bar B is not always limited to the position illustrated in FIG. 3 (position after being rotated by 60° from the upper position), but can be either position between the upper and lower positions.

As shown in FIG. 4, when the swing member 66 is located at the lower position, the receiving face 76b extends vertically at a position on a far side from the bar rack 20 with respect to the guide rail 8. At this lower position, the swing member 66 is located at an escape position after passing beyond the guide rail 8. When the swing member 66 is located at the lower position, and the bar regulation member 54 is located at the escape position as described above, an obstruction-free ejection space 79 for ejecting the bar B from the guide rail 8 is created between the rotation shaft 64 above the guide rail and the bar rack 20. Specifically, when the swing member 66 is located at the lower position, an upward-extending open space is created between the receiving face 74b/flank face 74c and the bar rack 20. In this embodiment, the lower position is set at a position after the swing member 66 is rotated downward from the upper position by 120°.

As shown in FIG. 5, when the swing member 66 is located at the lower position, the regulation-section support member 56 and the bar regulation member 54 can be pivotally moved from the regulation position to the escape position to create an obstacle-free passage (ejection space) capable of allowing the bar B to be ejected from the guide rail 8 to a position above the bar rack 20 through and between the rotation shaft 64 and the bar rack 20.

As shown in FIG. 2, the bar push-up device 68 includes a link mechanism 80 extending from the vicinity of the cam face 76 through below said guide rail 8 to the bar rack 20. The link mechanism 80 has a first end provided with a cam follower 88 following along the cam face 76, and a second or opposite end provided with a push-up member 78 designed to be movable between a retraction position where the push-up member 78 is retracted so as not to protrude from the support surface 38 of the bar rack 20, and a push-up position where the push-up member 78 protrudes from the support surface 38 so as to push up the bar B. As shown in FIGS. 2 and 3, from a schematic standpoint, when the swing member 66 is swung between the upper and lower positions, the cam follower can follow along the cam face 76, and the bar push-up member 78 can be moved between a retraction position and a push-up position.

The link mechanism 80 will be described in detail below. The link mechanism 80 comprises the cam follower 88 abutting cam face 76, a first double-arm swing member 90 having a first arm 90a with the cam follower 88 and extending substantially downward from the cam follower 88, a link member 92 having one end 92a connected to an end of a second arm 90b of the first double-arm swing member 90 in a pivotally movable manner and extending substantially laterally from the one end 92a, and a second double-arm swing member 94 having a third arm 94a connected to the other end of the link member 92 in a pivotally movable manner, and the bar push-up member 78 having a bottom surface 84 abutting a fourth arm 94b of the second double-arm swing member 94. The bar push-up member 78 is attached to the rack member 40 in a manner capable of pushing up the bar B placed on the bar rack 20. The bar push-up member 78 is biased downward or toward the retraction position by a biasing member, such as a spring. When the cam follower 88 is moved in a direction coming away from the rotation shaft 64, the second arm 90b of the first double-arm swing member 90 can be swung about a pivot shaft 90c in a direction coming close to the rack member 40. Thus, the link member 92 can be laterally moved toward the rack member 40, and the fourth arm 94b of the second double-arm swing member 94 can be swung about a pivot shaft 94c to push up the bar push-up member 78.

As shown in FIGS. 1 and 5, the bar feeder 2 further includes a bar lift device 100 disposed each space between the adjacent guide rail portions and designed to lift up the bar B residing in the guide rail 8 from below the bar B. In this embodiment, the bar lift device 100 is disposed between the upstream guide rail portion 8b and the downstream guide rail portion 8a. The bar lift device 100 comprises a lift member 10 designed to pivotally moved about a pivot shaft 102 between a first position lower than an inner bottom surface of the guide rail 8 and a second position higher than the inner bottom surface, and a operation lever 106 attached to the lift member 104 in such a manner as to pivotally move the lift member 104 about the pivot shaft 102.

Referring to FIG. 5, the bar feeder 2 includes an inhibition member 108 for preventing the bars B from being moved from the bar rack 20 to the swing member 66 in an operation for removing the bar B residing in the guide rail 8. In this embodiment, the inhibition member 108 consists of a pin 108 inserted into a hole formed in the top surface 48 of the stopper 46 of the rack member 40 and detachably attached. The pin 108 is designed to protrude from the top surface 48 when it is attached, so as to prevent the bar from being moved from the bar rack 20 to the swing member 66.

Next, an operation of the bar feeder according to the first embodiment will be described below. As shown in FIG. 2, after an operator firstly move the bar regulation section 42 to the escape position and places a plurality of bars (new bars) B on the bar rack in a line, the operator returns the bar regulation section 42 to the regulation position. In this stage, the swing member 66 is located at the upper position. That is, the swing member 66 extends from the rotation shaft 64 to the bar rack 20 across and over the guide rail 8. The bar push-up member 78 is located at the retraction position according to the link mechanism, as described later.

Upon activation of the bar feeder 2, in the normal mode for loading the bar into the guide rail 8, the bar take-out mechanism 22 takes out one of the bars B from the bar rack 20 and loads the taken-out bar into the guide rail 8, under control of the controller 24.

Specifically, the controller 24 firstly operates to drive the servomotor 70 so as to rotate the rotation shaft 64 and swing the swing member 66. As shown in FIG. 3, the swing member 66 is normally rotated downward from the upper position toward the intermediate position. In the intermediate position, the receiving face 74b is located at a position where the receiving face 74b is substantially flush with or below the top surface 48 of the stopper 46. Simultaneously, the cam follower 88 follows along the cam face 76 in such a manner as to come away from the rotation shaft 64. In conjunction with this movement, the first double-arm swing member 90, the link member 92 and the second double-arm swing member 94 are moved to push up the bar push-up member 78 against the biasing member 82. Thus, only the downstream-most one of the bars B on the stock member 40 is pushed up. This bar B rolls along the top surface 48 to the swing member, and the swing member receives the bar B.

Then, as shown in FIG. 4, the rotation shaft 64 is further rotated to swing the swing member downward from the intermediate position to the lower position beyond the guide rail 8. In this lower position, the receiving face 74b of the swing member 66 is located to extend vertically at a position on a far side from the bar rack 20 with respect to the guide rail 8, and thereby the bar B falls or is loaded into the guide rail 8. More specifically, in connection with the downward swing movement of the swing member 66, the bar B received by the swing member 66 is moved downward along the guide surface 50 while being supported by the receiving face 74a. When the swing member 66 is swung to the lower position, the receiving face 74b of the swing member 66 passes beyond the guide rail 8, and an open space is creamed between the receiving face 74a and the guide surface 50. Thus, the bar B falls into or is loaded the guide rail 8. During this swing movement, the bar push-up member 78 is kept at the push-up position because the profile of the cam face 76 is formed using a constant curvature radius from the rotation shaft 64.

After completion of loading of the bar B into the guide rail 8, as shown in FIG. 2, the rotation shaft 64 is inversely rotated to swing the swing member 66 from the lower position to the upper position, and kept in the standby state at the vicinity of upper position until an operation for loading the next bar B. Differently from the downward swing movement of the swing member 66, the cam follower 88 is moved along the cam face 76 in the reverse direction. When the cam follower 88 is moved along the cam face 76, the cam follower comes close to the rotation shaft 64. In response to this movement, the first double-arm swing member 90, the link member 92 and the second double-arm swing member 94 are moved to allow the fourth arm 94b of the second double-arm swing member 94 to come away from the rack member 40. Thus, the bar push-up member 78 is retracted to the retraction position by the biasing member 82. Successively, the next bar B rolls on the support surface 38 and comes into contact with the stopper 46.

Then, the bar B loaded in the guide rail 8 is fed to the NC lathe 4 by the feed rod 10. In an initial position of the guide rail 8, the primary-feeding guide rail portion 28 of the upstream guide rail portion 8b is located on the feeding axis 1A, and coaxially aligned with the downstream guide rail portion 8a. Firstly, a primary feeding of the bar is performed. When the bar B is supplied from the bar rack and loaded in the guide rail portions 8a, 28 in the aforementioned operation, the controller 24 operates to drive the primary-feed-member driving device (not shown) so as to move the primary feed member 12 in the downstream direction which is connected to the endless belt of the primary-feed-member driving device. The primary feed member pushes a rear end of the bar B in the downstream direction to move the bar B to a primary feeding position. A front end of the bar B is gripped by a clamp (not shown) to restrict a longitudinal movement of the bar B.

Subsequently, under control of the controller 24, the upstream guide rail portion 8b is moved laterally with respect to the feeding axis 1A to align the downstream guide rail portion 8a with the secondary-feeding guide rail portion 30. Then, a secondary feeding is performed. The controller 24 operates to drive the servomotor (not shown) of the feed-rod driving device 14 to move the feed rod 10 connected to the endless belt 14b of the feed-rod driving device 14, in the downward direction. When the feed rod 10 is moved forward to insert the rear end of the bar B into the finger chuck 10b at the downstream end thereof, the clamp is released. Thus, the front end of the bar B is released from the restriction of the clamp.

The feed rod 10 feeds the front end or downstream end of the bar B to the machining section 4c of the NC lathe 4. During machining of the bar, the anti-vibration devices 16 are closed to grip the bar so as to prevent vibrations of the bar B. The opening/closing of the anti-vibration device may be performed in conjunction with the rotation shaft 64 of the swing member 66, or may be performed using other driving system. When the bar B is shortened to have a length incapable of being cut into the given length of the product, the feed rod 10 is pulled back toward the bar feeder 2, and the remaining bar is gripped by the clamp. Then, the feed rod 10 is further moved rearward to detach the remaining bar therefrom and the remaining bar is dropped into the remainder rack 18 through a remainder disposal window (not shown). Subsequently, the same operation will be repeatedly performed to load the bars into the guide rail one by one.

In the normal mode, if it occurs that the bar loaded in the guide rail 8 has to be removed from the guide rail 8, an operator manually switches the controller 24 from the normal mode to a removal mode. In the removal mode, the controller 24 operates to control several devices of the bar feeder 2 so as to allow the bar B to be removed from the guide rail 8.

Specifically, the operator firstly inserts the pin 108 into the hole formed in the upper surface 48 of the stopper 46 of the rack member 40. Then, the operator manually operates the controller 24 to swing the swing member 66 from the upper position to the lower position. While the bar push-up member 78 is moved to the push-up position in conjunction with the swing movement, and the downstream-most one of the bars on the rack member 40 is pushed up, the pin 108 can prevent the bar from being moved to the swing member 66.

When the swing member 66 is moved to the lower position, an obstacle-free space is created between the rotation shaft 64 located above the guide rail 8 and the bar rack 20 located obliquely above the guide rail 8, as shown in FIG. 5. Further, the operator moves the regulation-section support member 56 and the bar regulation member 54 to the escape position. This makes it possible to eliminate obstacles from an upper space of the rack member 40 so as to create the ejection space 79 for allowing the bar B to be ejected above the guide rail 8.

During the above operation, the controller 24 operates to move the feed rod 10 to the inside of the secondary-feeding guide rail portion 30. The operator detaches the rear end of the bar B from the finger chuck 10b. If the bar B has a relatively long length, the front end of the bar can remain in the spindle 4b. In this case, the operator continuously operates the controller 24 manually to laterally move the upstream guide rail 8b so as to align the primary-feeding guide rail portion 28 with the down stream guide rail portion 8a. Then, the operator pulls the bar B into the primary-feeding guide rail portion 28, and pulls the front end of the bar B out of the spindle 4b. The operator takes up the bar B in the guide rail 8 by the hands, and ejects the bar B between the rotation shaft 64 and the bar rack 20 in a horizontal position.

When the bar B has a relatively short length, and the entire bar can be pulled out of the spindle 4b after the feed rod 10 is moved rearward to the secondary-feeding guide rail portion 30, the bar B can be ejected without the need for moving the upstream guide rail portion 8b.

If the bar has a relatively large weight, the operator may lift the bar B in the guide rail 8 to the space 79 using the lift device 100. The operator operates the operation lever 106 of the lift device 100 to lift the bar B using the lift member 104 and eject the bar B.

Figure 6:
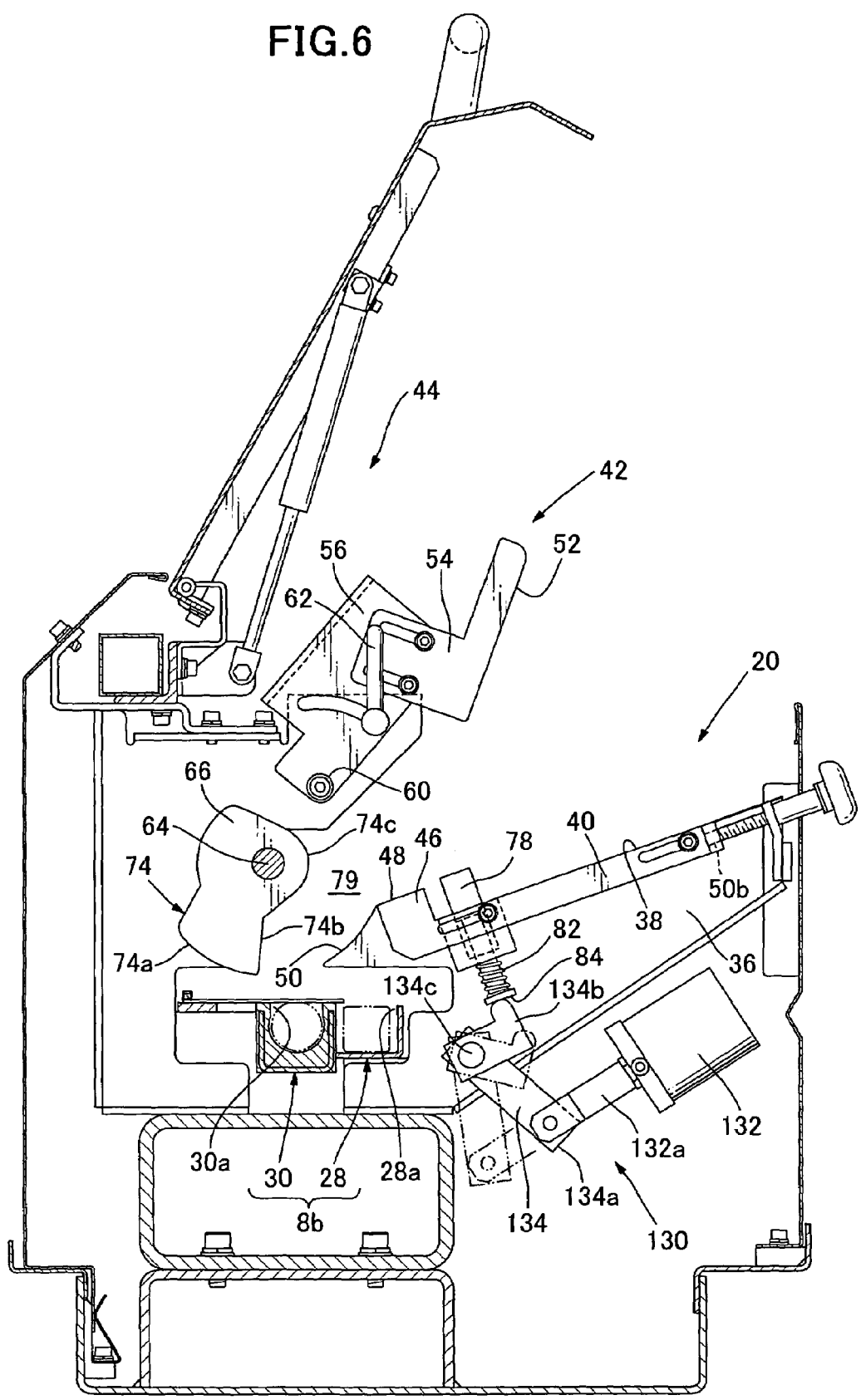
FIG. 6 is a cross-sectional view showing one example of modification of a bar push-up device in the bar feeder, taken along the line 2-2 in FIG. 1.

FIG. 6 is a bar feeder according to a second embodiment of the present invention, taken along the line 2-2 in FIG. 1.

With reference to FIG. 6, a bar feeder according to the second embodiment will be described. Except for the structure of a bar lift device, the bar feeder according to the second embodiment has the same structure as that in the first embodiment illustrated in FIGS. 2 to 5. Thus, the following description will be made only for the bar lift device. Further, the same element or component as that in the first embodiment is indicated by the same reference numeral, and its description is omitted.

In the bar lift device in the second embodiment, the link mechanism 80 is omitted, and a push-up-member driving device non-interlocked with the swing member 66 is used in place thereof. As shown in FIG. 6, the push-up-member driving device 130 is disposed below the bar lift member 78 to move the bar lift member 78 to the push-up position. The push-up-member driving device 130 comprises an actuator 132, such as air cylinder, adapted to be movable between a stretch position and a retraction position, and a double-arm swing member 134 having a first arm 134a attached to the actuator 132 in a pivotally movable manner. The double-arm swing member 134 is swingable about a pivot shaft 134c. The double-arm swing member 134 has a second arm 134b designed to abut a bottom surface of the lift member 78, and swung in conjunction with the movement of the actuator 132 from the stretch position to the retraction position so as to push up the lift member. The actuator 132 is designed to be controlled by the controller 24.

An operation of the bar feeder according to the second embodiment will be described. Except that the lift member is operated by the controller without being interlocked with the swing member, the operation of the bar feeder according to the second embodiment is the same as that of the bar feeder according to the first embodiment. Thus, the following description will be made only for a difference therebetween, and description about other common operations is omitted.

When the swing member is swung downward toward the intermediate position, the controller 24 operates to move the actuator 132 to the retraction position so as to push up the bar push-up member 78 to the push-up position through the double-arm swing member 134. Then, when the swing member 66 is swung upward from the intermediate position to upper position, the controller 24 operates to move the actuator 132 to the stretch position so as to move the second arm 134b of the double-arm swing member 134 away from the bar push-up member 78. The bar push-up member 78 is moved to the retraction position by a biasing force of the biasing member 82, such as spring. The above timings of pushing/retracting the bar push-up member 78 are exemplary, and they may be changed by the controller 24.

Figure 10:
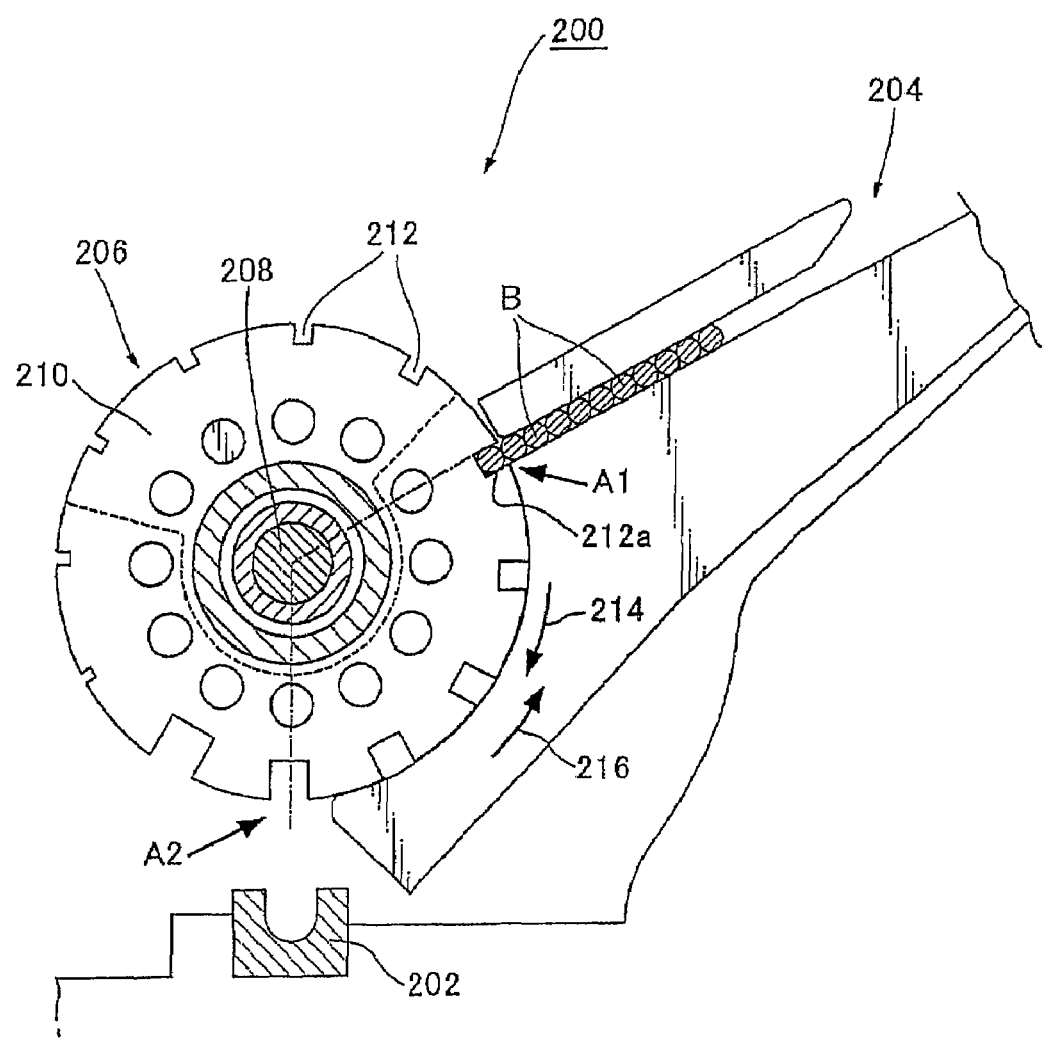
FIG. 10 is a cross-sectional view showing a conventional bar feeder.

The control, particularly, of the bar take-out mechanism 22 in the above first and second embodiments is the same as that in the index plate of the conventional device, and common control programs may be used. Thus, there is no need for preparing a new control program. While the conventional bar feeder using the index plate is different from the above embodiments in that a height of the bar rack thereof is set at a value greater than that of the rack member 40 of the bar rack 20 in the above embodiments (see FIG. 10), controls about position and rotation of the rotation shaft 64 are the same as those of the index plate. Specifically, the aforementioned upper position of the swing member 66 corresponds to a rotational position (the position illustrated in FIG. 10) where the pocket of the index plate receives a bar from the bar rack. Further, the lower position of the swing member 66 corresponds to a position where the bar is loaded into a guide rail by the index plate. In the above first and second embodiments, the swing member 66 is employed in place of the index plate, and obstacles are eliminated above the guide rail 8 in the removal mode to form the bar ejection space 79. Thus, the swing member 66 has no need to have pockets for receiving bars B. Thus, the rack member 40 of the bar rack 20 is designed to have a height less than the upper position (corresponding to a bar receiving position in the index plate). Based on this determined upper position, the swing member is designed to receive a bar when the swing member 66 reaches a position where it is inclined obliquely downward relative to the rack member 40 of the bar rack 20, in the course where the swing member 66 is moved from the upper position to the lower position.

In the first embodiment, link mechanism and the cam face 76 formed in the swing member 68 are employed. Thus, the bar take-out mechanism 68 is operated based on a rotational movement of the rotation shaft 64, i.e., a swing movement of the swing member 66. This makes it possible to take out a bar using the bar take-out mechanism 68 and load the bar into the guide rail 8 using the swing member 66, without changes in control program for the index plate.

Figure 7:
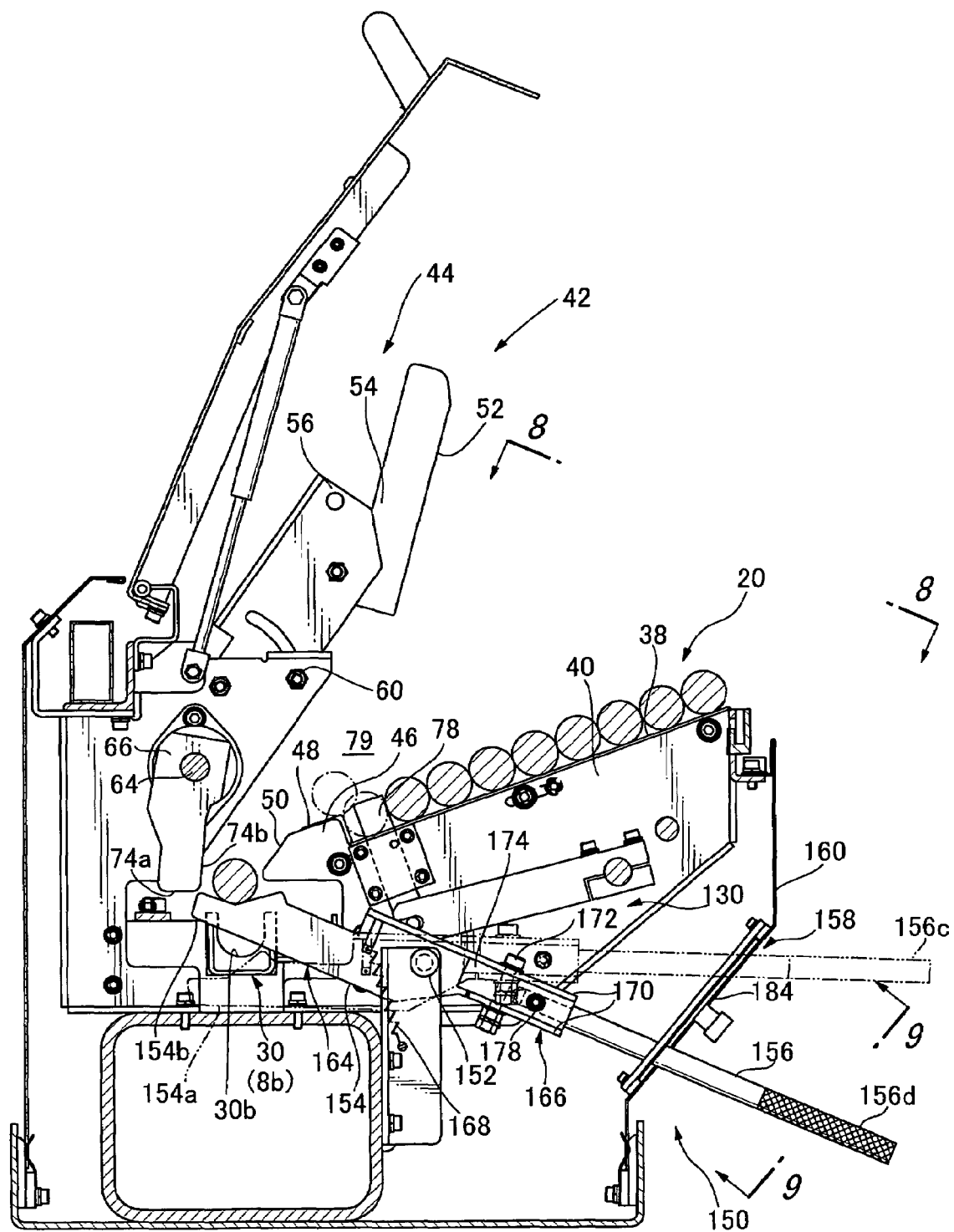
FIG. 7 is a cross-sectional view showing one example of modification of a bar lift device in the bar feeder, taken along the line 5-5 in FIG. 1.
Figure 8:
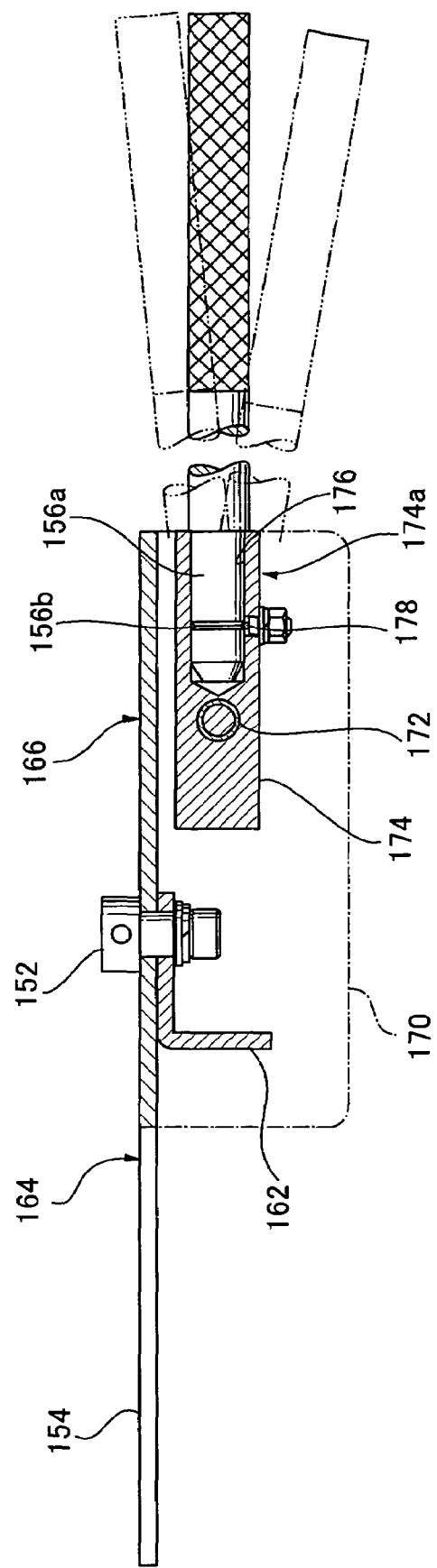
FIG. 8 is an enlarged sectional view showing the bar lift device, viewed from the arrow 8-8 in FIG. 7.
Figure 9:
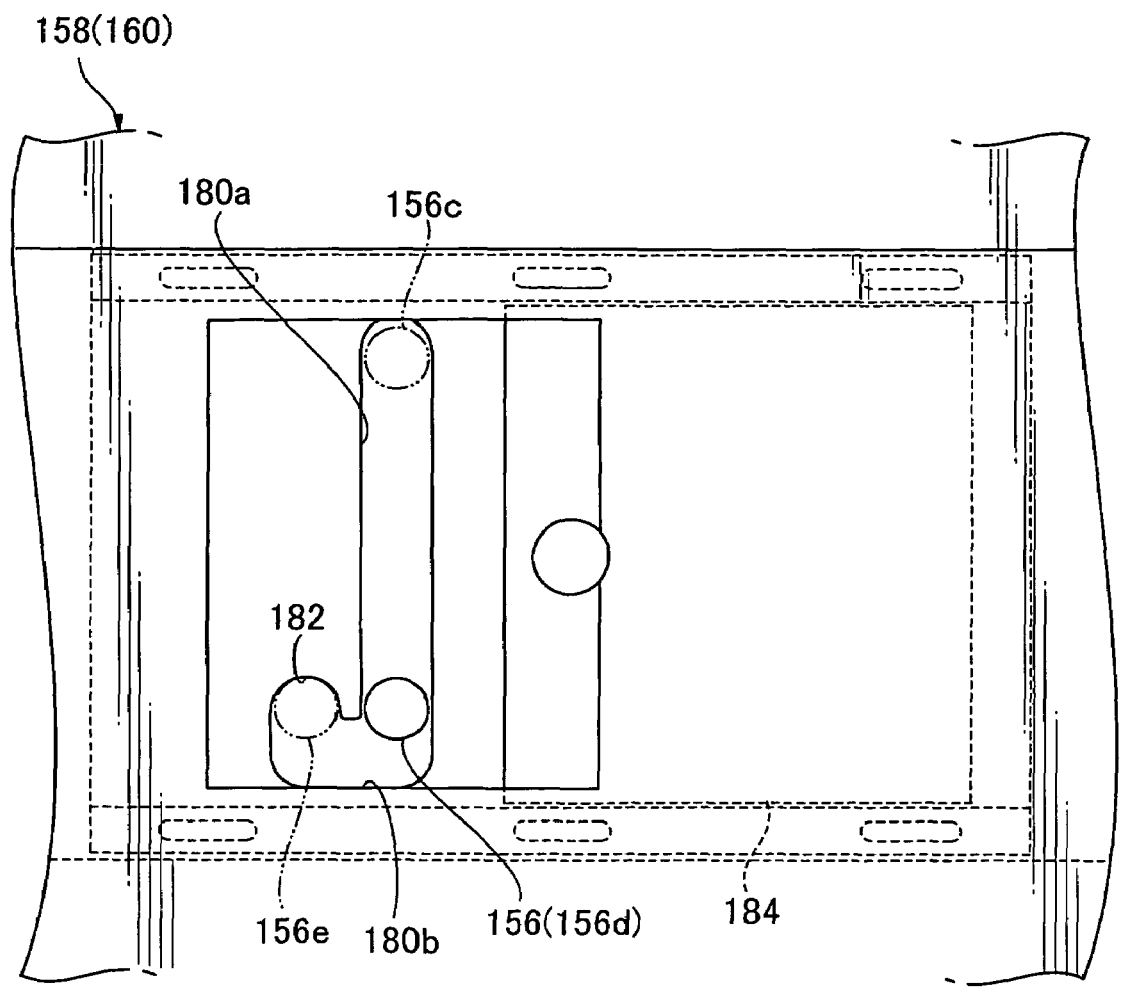
FIG. 9 is an enlarged view showing the bar lift device, viewed from the arrow 9-9 in FIG. 7.

With reference to FIGS. 7 to 9, a bar feeder according to a third embodiment of the present invention will be described. FIG. 7 is a cross-sectional view showing the bar feeder according to the third embodiment, taken along the line 5-5 in FIG. 1. FIG. 8 is an enlarged sectional view showing a lift device described below, viewed from the arrow 8-8 in FIG. 7. FIG. 9 is an enlarged view viewed from the arrow 9-9 in FIG. 7.

The bar feeder according to the third embodiment illustrated in FIGS. 7 to 9 includes a bar lift device which is different from that in the first embodiment illustrated in FIGS. 2 to 5, and in the second embodiment illustrated in FIG. 6. As to other components than the bar lift device, a bar lift device in the third embodiment is the same as that in the bar feeder according to the second embodiment illustrated in FIG. 6. The remaining structure is the same as that of the bar feeder according to the first embodiment illustrated in FIGS. 2 to 5. Thus, in the following description, the same element or component as that in the first and second embodiments is defined by the same reference numeral, and its description is omitted. The bar lift device which is different from that in the first and second embodiments will be specifically described. While, comparing FIGS. 2 to 6 with FIG. 7, some components are different in shape, but their technical concept is the same, and thus their description is also omitted.

The bar feeder 150 according to the third embodiment comprises a lift member 154 disposed to extend in a direction intersecting with the guide rail portion 8b and designed to be pivotally moved about a first pivot shaft 152 having an axis oriented in a longitudinal direction of the guide rail portion, a operation lever 156 for pivotally moving the lift member 154 about the first pivot shaft 152 between an escape position 154a where the lift member 154 is located below the inner bottom surface 30b of the guide rail 30, and a lift position 154b where the lift member 154 is located above the inner bottom surface 30b, and a lock device 158 for locking the operation lever 156 to allow the lift member 154 to be kept at the lift position. In this embodiment, the lock device 158 is formed in a sidewall 160 of the bar feeder 2.

In the present embodiment, the lift member 154 is disposed inside the sidewall 160 between the upstream guide rail portion 8b and the downstream rail portion 8a. The lift member 154 may further be disposed between the adjacent downstream guide rail portions. The first pivot shaft 152 is attached to a support structure of the bar feeder 2 on the side of bar rack 20 with respect to the guide rail portion 8b. The lift member 154 extends to both sides of the first pivot shaft, i.e., to the sides of the guide rail 8b and the bar rack 20. The lift member 154 includes a support portion 164 located on one of the sides or on the side of the guide rail portion 8a and designed to support the bar in the guide rail portion 8b, and a mounting portion 166 located on the other side or on the side of the bar rack 20 and designed to mount the operation lever 156. The support portion 164 of the lift member 154 is biased downward by a spring 168 extending between the support structure and the support portion 164.

In this embodiment, the lift member 154 is formed of a plate member having a upright rectangular shape in section. The mounting portion 166 extends in a lateral direction relative to a longitudinal axis of the lift member 154 and has two bent portions 170 disposed in vertically spaced-apart, opposed relation to one another. The mounting portion 166 is provided with a second pivot shaft 172 extending between the bent portions 170 and oriented vertically relative to an axis of the first pivot shaft 152, and a pivot bracket 174 fitted between the bent portions 170 and designed to be pivotally movable about the second pivot shaft 172 in a lateral direction relative to the longitudinal axis of the lift member 154.

The operation lever 156 extends from the lift member 154 through the sidewall 160 of the bar feeder 2 to protrude outside the sidewall 160. The operation lever 156 has a portion located inside the sidewall and detachable attached to the lift member 154. Specifically, as shown in FIG. 8, the operation lever 156 has an anchor end 156a formed in a circular shape in section. Further, the anchor end 156a is formed with a groove 156b extending in a circumferential direction thereof. The pivot bracket 174 has an end 174a including a hole 176 and a retaining member 178. The hole 176 is formed to allow the anchor end 156a of the operation lever 156 to be fitted therein. The retaining member 178 is designed to, when the operation lever 156 is attached to the pivot bracket 174, align with the groove 156b and cooperate with the grooves 156b so as to prevent the operation lever 156 from being pulled out of the hole 176. For example, the retaining member 178 has a spherical surface. In this case, the spherical surface may be designed to be biased toward the groove 156b by a spring when the operation lever 156 is attached, and to be pushed back against the spring by the anchor end 156a of the operation lever 156 when the operation lever 156 is detached.

The operation lever 156 extends to the opposite side of the lift member 154 with respect to first pivot shaft 152. Thus, when the lift member 154 is located at a lower or escarp position 154a, the operation lever 156 is located at an upper position 156c. In contrast, when the lift member 154 is located at an upper position 154b, the operation lever 156 is located at a lower position 156d (see FIG. 7). As shown in FIG. 9, the operation lever 156 can be moved along a first path defined when the lift member 154 is moved about the first pivot shaft 152 from the escape position 154a and the lift position 154b, i.e., when the operation lever is moved from the upper position 156c to the lower position 156d, and a second path defined when the operation lever is moved in association with its lateral pivotal movement about the second pivot shaft 172, from an end position of the first path to a lock position 156e where the operation lever is locked by the lock device 158 so as to keep the lift member 154 at the lift position 154b. The lock position 156e of the operation lever 156 is displaced laterally relative to the lower position 156d thereof.

The sidewall 160 formed with the lock device 158 has a cutout portion 180a along the first path and a cutout portion 180b along the second path, in which the operation lever 156 moves. The cutout portion 180a along the first path is formed to extend vertically so as to allow the operation lever 156 to be moved from the upper position 156c to the lower position 156d. The cutout portion 180b along the second path is formed to extend laterally from a lower end of the first path, then, extend upward and terminate at the lock position 156e for locking the operation 156. The terminal end serves as an abutting surface 182 extending across and over the operation lever 156 at the lock position 156e so as to lock the operation lever. The first and second paths entirely form substantially "J" shape.

Further, the sidewall 160 is provided with a cover 184 designed to be slidably moved along the sidewall 160 between a closed position (not shown) for covering over the cutout portions, and an open portion for exposing the cutout portions.

An operation of the bar feeder according to the third embodiment will be described below. Except that the push-up member is operated by the controller without being interlocked with the swing member, the operation of the bar feeder according to the third embodiment is the same as that of the bar feeder according to the first embodiment. An operation of the lift member is the same as that of the bar feeder according to the second embodiment. Thus, the following description will be made only for an operation of the lift device, and description about other common operations is omitted.

In the removal operation for removing the bar B in the guide rail, the cover 184 of the sidewall 160 is moved to the open position, and the operation lever 156 is attached to the pivot bracket 174 of the lift member 154 from outside of the sidewall 160. Specifically, the anchor end 156a of the operation lever 156 is inserted into the pivot bracket 174, and the retaining member 178 is engaged with the groove 156b of the operation lever 156 to prevent the operation lever 156 from being pulled out of the hole 176.

Then, the operation lever 156 is moved about the first pivot shaft 154 along the first path or from the upper position 156c to the lower position 156d to pivotally move the lift member 154 from the escape position 154a to the lift position 154b. Thus, the bar B in the guide rail 30 is supported by the support portion 164 of the lift member 154 and lifted toward the ejection space 79. Then, the lift member 154 is kept at the lift position 154*b*, and the operation lever 156 is moved along the second path in the lateral pivot movement about the second pivot shaft, to the lock position 156*e* for locking the operation lever 156 by the lock device 158. An upward force from the weight of the bar B supported by the lift member 154 acts on the operation lever 156 at the lock position. Thus, the operation lever 156 is automatically locked by the abutting surface 182 extending across and above the operation lever 156, and thereby the lift member 154 is kept at the lift position 154*b*. Thus, the bar B can be maintained to be lifted in the ejection space. After the bar B is lifted into the ejection space 79, the operator can take off the operation lever 156, and remove the bar B outside through the ejection space 79.

In the normal mode for loading the bar into the guide rail 30, the operation lever 156 is moved along the second and first paths, and returned to the upper position 156*c*. Then, the operation lever 156 is pulled out of the pivot bracket 174, and the cover 184 is moved to the closed position.

While the present invention has been described in connection with the bar feeder as specific embodiments of the present invention, it is understood that the present invention is not limited to these specific embodiments, but various changes and modifications may be made therein without departing from the scope of the invention. The invention is intended to cover such changes and modifications.

While the controller 24 in the above embodiments is provided in the bar feeder 2, the control may be performed using a controller provided in a bar machining apparatus 4.

As the swing member 66 in the above embodiments is designed to be reciprocated between the upper position (position of 0°) and the lower position (position of 120°), control programs of the index-type can be advantageously used without changes. In view of reduction in operation or process time, it is necessary to arrange the swing member 66 in a standby state in the vicinity of a bar rack 20. From the standpoint of taking out a bar B from a bar rack 20, it is not essential to arrange the swing member 66 in a standby state or the upper position (position of 0°). Thus, the swing member 66 may return from the lower position to any standby position in the vicinity of the bar rack 20. For example, the standby position may be lower than the support surface 38 of the bar rack 20. In this case, in the first embodiment, the profile of the cam face for controlling the up/down movements of the bar push-up member 78 of the bar take-out mechanism 68 may be changed to allow the bar push-up member 78 to be pushed out or retracted in conformity to the movement of the swing member 66. In the second embodiment, the control of the actuator 132 for the movement of bar push-up member 78 may be adjusted in conformity to the movement of the swing member 66.

Further, the position of the swing member 66 in the bar removal mode is not limited to the above lower position, but may be any other suitable position other than the upper side of the guide rail, for example, a position after being further normally rotated from the lower position). Furthermore, in the above embodiments, the upper position, the bar receiving position (upper position) and the lower position for loading the bar into guide rail 8 are set at 0°, 60° and 120°, respectively. However, 60° of relative positional relation is not essential, but may be appropriately changed.

While the bar regulation member 54 and regulation-section support member 56 in the above embodiments are supported from above to come across the upper side the guide rail, these member may be supported from below to omit the escaping mechanism for regulation-section support member 56.

While the number of the bar lift device 100 is one, it may be two or more.

While the inhibition member 108 in the above embodiments is a detachable pin, the inhibition member 108 may be a mechanism having an actuator for activating a member movable between an inhibition position for preventing a movement of bars to the swing member 66, and a non-inhibition position for releasing the restriction of movement.

While the manual control lever 156 in the third embodiment is moved to the lock position by pivotally moving the manual control lever 156 laterally about the second pivot shaft 172, it is not essential to pivotally move the manual control lever 156 laterally about the second pivot shaft 172 if the manual control lever 156 can otherwise be locked. For example, a member for locking the manual control lever 156 at the lower position 156*d* may be used.

While the first path in the third embodiment is formed as a linear path, the configuration of the first path is not limited to linear, but any other suitable shape capable of lifting the lift member 154 to the lift position 154*b*, for example, a slanted path or curve-shaped path, may be used. Further, as to the second path, any other suitable shape capable of moving the manual control lever 156 from the first path to the lock position 156*e* may be used. Thus, while the first and second paths in the third embodiment are entirely formed as "J" shape, it may be, for example, "L" shape. Furthermore, as long as the manual control lever 156 can be moved along the first and second paths, the cutout portions 180*a*, 180*b* of the sidewall may have any configuration.

While the escape positing 154*a* of the lift member 154 in the third embodiment is set to be below the inner bottom surface 30*b* of the guide rail 30, the escape position 154*a* may be flush with the inner bottom surface 30*b*.

While the bar regulation member 54 and regulation-section support member 56 in the above embodiments are moved in the removal operation for the bar B, the bar B may be removed without moving the escape position 154*a* of the lift member 154 if the bar B can be removed in a state after being lifted using the bar lift device 100, 150.

What is claimed is:

1. A bar feeder for feeding a bar to a bar machining apparatus, comprising:

a guide rail for guiding a bar to a bar machining apparatus;

a bar rack located obliquely above said guide rail and designed to allow a plurality of bars to be placed thereon; and a bar take-out mechanism for taking out the bars one-by-one from said bar rack and loading said taken-out bar into said guide rail, said bar take-out mechanism including a rotation shaft located above said guide rail, a swing member attached to said rotation shaft and designed to extend from said rotation shaft to said bar rack and receive the bar taken out from said bar rack, and an arc-shaped guide surface for guiding the bar taken out from said bar rack, toward said guide rail, wherein said swing member has a receiving face extending radially outward from said rotation shaft, and said receiving face and said guide surface are arranged to create therebetween a space for receiving the bar taken out from said bar rack, wherein said bar take-out mechanism further includes bar push-up device for pushing up one of the bars from said bar rack to supply said pushed bar to said swing member, and a controller, said controller being operable, in a normal mode for loading the bar into said guide rail, so that said swing member is normally rotated downward from an upper position where said swing member is located to extend across and over said guide rail up to said bar rack, to a lower position where said swing member is located on a far side from said bar rack with respect to said guide rail, so as to allow said swing member to receive the bar taken out by said bar take-out mechanism, at any position between said upper and lower positions, then normally rotate downward along the guide surface and then create an open space between said receiving face of said swing member and said guide surface at a position where the receiving face passes beyond said guide rail to cause the received bar to fall into said guide rail and load said fallen bar in said guide rail, and said swing member is then reversely rotate back to a position adjacent to said upper position and kept in a standby state until an operation for loading a next one of the bars.

2. The bar feeder as defined in claim 1, wherein:
said bar rack has a support surface for supporting the bars;
said swing member has a cam face on the opposite side of said bar rack with respect to said rotation shaft;
said bar push-up device includes a link mechanism extending from the vicinity of said cam face through below said guide rail to said bar rack, said link mechanism having a first end provided with a cam follower, and a second end provided with a push-up member designed to be movable between a retraction position where said push-up member is retracted so as not to protrude from said support surface, and a push-up position where said push-up member protrudes from said support surface so as to push up one of the bars, said cam follower being designed to follow along said cam face in conjunction with the swing movement of said swing member in such a manner as to move said bar push-up member between said retraction position and said push-up position.

3. The bar feeder as defined in claim 1, wherein said bar push-up device is designed to be movable between a push-up position for pushing up one of the bars from said bar rack and a retraction position, and said controller is operable, in the normal mode for loading the bar to said guide rail, so that said bar push-up device is moved to said push-up position so as to allow the bar to be supplied to said swing member, and in response to a manual operation of an operator in a removal mode for removing the bar residing in said guide rail, said bar push-up device is kept at said retraction position, and said swing member is moved without a bar to said lower position or a position where said swing member is further normally rotated from said lower position, so as to create an ejection space for ejecting said bar from said guide rail, between said rotation shaft and said bar rack.

4. The bar feeder as defined in claim 3, wherein said bar rack has a bar regulation section disposed above said support surface to regulate the bars in such a manner as to be placed on said support surface in a line, and a support structure extending across said ejection space to support said bar regulation section, said support structure being designed to be movable to a position for escaping from said ejection space.

5. The bar feeder as defined in claim 3, wherein said guide rail has a plurality of guide rail portions arranged coaxially in spaced-apart relation to each other, and includes a bar lift device disposed between the adjacent guide rail portions and designed to lift up the bar residing in said guide rail from below said bar to said ejection position.

6. A bar feeder for feeding a bar to a bar machining apparatus, comprising:
a guide rail for guiding a bar to a bar machining apparatus;
a bar rack located obliquely above said guide rail and designed to allow a plurality of bars to be placed thereon; and
a bar take-out mechanism for taking out the bars one-by-one from said bar rack and loading said taken-out bar in said guide rail, said bar take-out mechanism including a rotation shaft located above said guide rail, a swing member attached to said rotation shaft and designed to extend from said rotation shaft to said bar rack and receive the bar taken out from said bar rack, and an arc-shaped guide surface for guiding the bar taken out from said bar rack, toward said guide rail, wherein said swing member has a receiving face extending radially outward from said rotation shaft, and said receiving face and said guide surface are arranged to create therebetween a space for receiving the bar taken out from said bar rack,
wherein said bar take-out mechanism further includes bar push-up device for pushing up one of the bars from said bar rack to supply said pushed bar to said swing member, and a controller, said controller operating, in a normal mode for loading the bar into said guide rail, so that said swing member is normally rotated downward from an upper position where said swing member is located to extend across and over said guide rail up to said bar rack, to a lower position where said swing member is located on a far side from said bar rack with respect to said guide rail, so as to allow said swing member to receive the bar taken out by said bar take-out mechanism, at any position between said upper and lower positions, then normally rotate downward along the guide surface and then create an open space between said receiving face of said swing member and said guide surface at a position where the receiving face passes beyond said guide rail to cause to the received bar to fall into said guide rail and load said fallen bar in said guide rail, and said swing member is then reversely rotated back to a position adjacent to said upper position and kept in a standby state until an operation for loading a next one of the bars,
wherein said bar feeder further includes inhibition device for preventing the bars from moving from said bar rack to said swing member in a removal mode for removing the bar residing in said guide rail,
wherein said controller is operable, in response to a manual operation of an operator when the movement of the bars to said swing member is inhibited by said inhibition device in said removal mode for removing the bar residing in said guide rail, so that said swing member is moved without a bar to said lower position or a position where said swing member is further normally rotated from said lower position, so as to create an ejection space for ejecting said bar from said guide rail, between said rotation shaft and said bar rack.

7. The bar feeder as defined in claim 6, wherein:
said bar rack has a support surface for supporting the bars;
said swing member has a cam face on the opposite side of said bar rack with respect to said rotation shaft;
said bar push-up device includes a link mechanism extending from the vicinity of said cam face through below said guide rail to said bar rack, said link mechanism having a first end provided with a cam follower, and a second end provided with a push-up member designed to be movable between a retraction position where said push-up member is retracted so as not to protrude from said support surface, and a push-up position where said push-up member protrudes from said support surface so as to push up one of the bars, said cam follower being designed to follow along said cam face in conjunction with the swing movement of said swing member in such a manner as to move said bar push-up member between said retraction position and said push-up position.

8. The bar feeder as defined in claim 6, wherein said guide rail has a plurality of guide rail portions arranged coaxially in spaced-apart relation to each other, and includes bar lift device disposed between the adjacent guide rail portions and designed to lift up the bar residing in said guide rail from below said bar to said ejection position.

9. The bar feeder as defined in claim 8, wherein said lift device includes:
a lift member disposed to extend in a direction intersecting with said guide rail portion and designed to be pivotally moved about a first pivot shaft having an axis oriented in a longitudinal direction of said guide rail portion;
a operation lever for pivotally moving said lift member about said first pivot shaft between an escape position where said lift member is located flush with or below an inner bottom surface of said guide rail, and a lift position where said lift member is located above said inner bottom surface; and
lock device for locking said operation lever to allow said lift member to be kept at said lift position.

10. The bar feeder as defined in claim 9, wherein:
said operation lever is disposed to extend to the other side of the first pivot shaft with respect to said lift member, and pivotally attached to said lift member through a second pivot shaft oriented vertically relative to an axis of said first pivot shaft, said operation lever being designed to be movable along a first path defined when said lift member is moved about said first pivot shaft from said escape position and said lift position, and a second path defined when said operation lever is moved in association with its lateral pivotal movement about said second pivot shaft, from an end position of said first path to a lock position where said operation lever is locked by said lock device so as to keep said lift member at said lift position; and
said lock device has a abutting surface formed to extend across and above said operation lever at said lock position so as to lock said operation lever.

11. The bar feeder as defined in claim 10, which has a sidewall, wherein:
said operation lever extends from said lift member and penetrates said sidewall to protrude outside said sidewall; and
said sidewall is formed with a cutout portion for allowing said operation lever to be moved along said first path and said second path, said cutout portion having said abutting surface.

12. The bar feeder as defined in claim 11, wherein said operation lever has a portion located inside said sidewall and detachably attached to said lift member.

13. The bar feeder as defined in claim 6, wherein said bar rack has a rack member formed with a support surface, a bar regulation section disposed above said support surface to regulate the bars in such a manner as to be placed on said support surface in a line, and a support structure extending across said ejection space to support said bar regulation section, said support structure being designed to be movable to a position for escaping from said ejection space.

14. A bar machining system comprising:
a bar machining apparatus for machining a bar; and
a bar feeder for feeding a bar to a bar machining apparatus, said bar feeder including:
a guide rail for guiding the bar to a bar machining apparatus;
a bar rack located obliquely above said guide rail and designed to allow a plurality of the bars to be placed thereon; and
a bar take-out mechanism for taking out the bars one-by-one from said bar rack and loading said taken-out bar into said guide rail, said bar take-out mechanism including a rotation shaft located above said guide rail, a swing member attached to said rotation shaft and designed to extend from said rotation shaft to said bar rack and receive the bar taken out from said bar rack, and an arc-shaped guide surface for guiding the bar taken out from said bar rack, toward said guide rail, wherein said swing member has a receiving face extending radially outward from said rotation shaft, and said receiving face and said guide surface are arranged to create therebetween a space for receiving the bar taken out from said bar rack,
wherein:
said bar take-out mechanism further includes bar push-up device for pushing up one of the bars from said bar rack to supply said pushed bar to said swing member; and
said bar machining apparatus includes a controller, said controller being operable, in a normal mode for loading the bar into said guide rail, so that said swing member is normally rotated downward from an upper position where said swing member is located to extend across and over said guide rail up to said bar rack, to a lower position where said swing member is located on a far side from said bar rack with respect to said guide rail, so as to allow said swing member to receive the bar taken out by said bar take-out mechanism, at any position between said upper and lower positions, then normally rotate downward along the guide surface and then create an open space between said receiving face of said swing member and said guide surface at a position where the receiving face passes beyond said guide rail to cause the received bar to fall into said guide rail and load said fallen bar in said guide rail, and said swing member is then reversely rotated back to a position adjacent to said upper position and kept in a standby state until an operation for loading a next one of the bars.

15. The bar machining system as defined in claim 14 comprising:
wherein:
said bar bar push-up device is designed to be movable between a push-up position for pushing up one of the bars from said bar rack and a retraction position; and
said controller is operable, in a normal mode for loading the bar to said guide rail, so that said bar push-up device is moved to said push-up position so as to allow the bar to be supplied to said swing member, and in response to a manual operation of an operator in a removal mode for removing the bar residing in said guide rail, so that said bar push-up device is kept at said retraction position, and said swing member is moved without a bar to said lower position or a position where said swing member is further normally rotated from said lower position, so as to create an ejection space for ejecting said bar from said guide rail, between said rotation shaft and said bar rack.

16. The bar machining system as defined in claim 15, wherein said bar rack has a rack member formed with a support surface, a bar regulation section disposed above said support surface to regulate the bars in such a manner as to be placed on said support surface in a line, and a support structure extending across said ejection space to support said bar regulation section, said support structure being designed to be movable to a position for escaping from said ejection space.

17. The bar machining system as defined in claim 15, wherein said guide rail has a plurality of guide rail portions arranged coaxially in spaced-apart relation to each other, and includes a bar lift device disposed between the adjacent guide rail portions and designed to lift up the bar residing in said guide rail from below said bar to said ejection position.

18. A bar machining system comprising:
   a bar machining apparatus for machining a bar; and
   a bar feeder for feeding a bar to a bar machining apparatus, said bar feeder including:
      a guide rail for guiding the bar to said bar machining apparatus;
      a bar rack located obliquely above said guide rail and designed to allow a plurality of bars to be placed thereon; and
      a bar take-out mechanism for taking out the bars one-by-one from said bar rack and loading said taken-out bar into said guide rail, said bar take-out mechanism including a rotation shaft located above said guide rail, a swing member attached to said rotation shaft and designed to extend from said rotation shaft to said bar rack and receive the bar taken out from said bar rack, and an arc-shaped guide surface for guiding the bar taken out from said bar rack, toward said guide rail, wherein said swing member has a receiving face extending radially outward from said rotation shaft, and said receiving face and said guide surface are arranged to create therebetween a space for receiving the bar taken out from said bar rack,
   wherein:
      said bar take-out mechanism further includes bar push-up device for pushing up one of the bars from said bar rack to supply said pushed bar to said swing member;
   said bar machining apparatus includes a controller, said controller being operable, in a normal mode for loading the bar into said guide rail, so that said swing member is normally rotated downward from an upper position where said swing member is located to extend across and over said guide rail up to said bar rack, to a lower position where said swing member is located on a far side from said bar rack with respect to said guide rail, so as to allow said swing member to receive the bar taken out by said bar take-out mechanism, at any position between said upper and lower positions, then normally rotate downward along the guide surface and then create an open space between said receiving face of said swing member and said guide surface at a position where the receiving face passes beyond said guide rail to cause the received bar to fall into said guide rail and load said fallen bar in said guide rail, and said swing member is then reversely rotated back to a position adjacent to said upper position and kept in a standby state until an operation for loading a next one of the bars; and
   said bar feeder further includes inhibition device for preventing the bars from moving from said bar rack to said swing member in a removal mode for removing the bar residing in said guide rail,
   wherein said controller is operable, in response to a manual operation of an operator when the movement of the bars to said swing member is inhibited by said inhibition device in said removal mode for removing the bar residing in said guide rail, so that said swing member is moved without a bar to said lower position or a position where said swing member is further normally rotated from said lower position, so as to create an ejection space for ejecting said bar from said guide rail, between said rotation shaft and said bar rack.

19. The bar machining system as defined in claim 18, wherein said bar rack has a rack member formed with a support surface, a bar regulation section disposed above said support surface to regulate the bars in such a manner as to be placed on said support surface in a line, and a support structure extending across said ejection space to support said bar regulation section, said support structure being designed to be movable to a position for escaping from said ejection space.

20. The bar machining system as define in claim 18, wherein said guide rail has a plurality of guide rail portions arranged coaxially in spaced-apart relation to each other, and includes a bar lift device disposed between the adjacent guide rail portions and designed to lift up the bar residing in said guide rail from below said bar to said ejection position.

\* \* \* \* \*